(12) United States Patent
Tagami

(10) Patent No.: US 12,518,785 B2
(45) Date of Patent: Jan. 6, 2026

(54) MAGNETIC DISK APPARATUS AND METHOD WITH CALCULATING HEAD OFFSET BY CORRECTED BURST DEMODULATION VALUE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Naoki Tagami, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 48 days.

(21) Appl. No.: 18/444,423

(22) Filed: Feb. 16, 2024

(65) Prior Publication Data

US 2024/0412761 A1  Dec. 12, 2024

(30) Foreign Application Priority Data

Jun. 8, 2023  (JP) .................................. 2023-094930

(51) Int. Cl.
*G11B 5/596* (2006.01)
*G11B 5/55* (2006.01)
*G11B 5/82* (2006.01)

(52) U.S. Cl.
CPC ........ *G11B 5/59655* (2013.01); *G11B 5/5534* (2013.01); *G11B 5/59627* (2013.01); *G11B 5/59688* (2013.01); *G11B 5/82* (2013.01)

(58) Field of Classification Search
None
See application file for complete search history.

(56) References Cited

U.S. PATENT DOCUMENTS

| | | | |
|---|---|---|---|
| 8,699,165 B2 | 4/2014 | Huang et al. | |
| 9,343,094 B1* | 5/2016 | Ma et al. | G11B 5/59627 |
| 9,502,062 B1 | 11/2016 | Dorobantu et al. | |
| 9,564,157 B1 | 2/2017 | Trantham et al. | |
| 9,799,360 B2 | 10/2017 | Tagami | |
| 10,360,930 B1 | 7/2019 | Asakura et al. | |
| 10,854,238 B2 | 12/2020 | Tagami et al. | |

* cited by examiner

*Primary Examiner* — Craig A. Renner
(74) *Attorney, Agent, or Firm* — Knobbe, Martens, Olson & Bear, LLP

(57) ABSTRACT

According to one embodiment, a controller of a magnetic disk apparatus operates in a first operation of writing to data regions on a magnetic disk of the magnetic disk apparatus while positioning a magnetic head. In the first operation, the controller demodulates burst patterns to obtain a first burst demodulated value set and corrects the first burst demodulated value set to obtain a second burst demodulated value set. The first burst demodulated value set is corrected on the basis of a correction algorithm using a first set value as an argument. The controller calculates, on the basis of the second burst demodulated value set, an offset amount of the magnetic head from one of servo tracks on the magnetic disk.

20 Claims, 16 Drawing Sheets

MAGNETIC DISK APPARATUS AND METHOD WITH CALCULATING HEAD OFFSET BY CORRECTED BURST DEMODULATION VALUE

CROSS-REFERENCE TO RELATED APPLICATIONS

This application is based upon and claims the benefit of priority from Japanese Patent Application No. 2023-094930, filed on Jun. 8, 2023; the entire contents of which are incorporated herein by reference.

FIELD

Embodiments described herein relate generally to a magnetic disk apparatus and a method.

BACKGROUND

In the related art, a magnetic disk apparatus is configured to position a magnetic head on the basis of servo data recorded on a magnetic disk. The magnetic disk is provided with multiple tracks. In a write operation and a read operation, the magnetic disk apparatus positions the magnetic head on a target one of the multiple tracks.

DETAILED DESCRIPTION

In general, according to one embodiment, a magnetic disk apparatus includes a magnetic disk, a magnetic head, a memory, and a controller. On the magnetic disk, multiple servo tracks are provided. The multiple servo tracks are provided with multiple servo sectors that are arranged at intervals in a circumferential direction. The multiple servo sectors each store servo data including burst patterns. Each two of the multiple servo sectors adjacent to each other in the circumferential direction interpose a data region that allows data to be written. The magnetic head executes writing and reading on the magnetic disk. In the memory, a first set value is stored. In a first operation of performing writing to the data regions while positioning the magnetic head, the controller demodulates the burst patterns to obtain a first burst demodulated value set. In the first operation, the controller corrects the first burst demodulated value set to obtain a second burst demodulated value set. The first burst demodulated value set is corrected on the basis of a correction algorithm using the first set value as an argument. In the first operation, the controller calculates, on the basis of the second burst demodulated value set, an offset amount of the magnetic head from one of the multiple servo tracks.

Hereinafter, a magnetic disk apparatus and a method according to embodiments will be described in detail with reference to the accompanying drawings. Note that the present invention is not limited by the embodiment.

(Embodiment)

Figure 1:
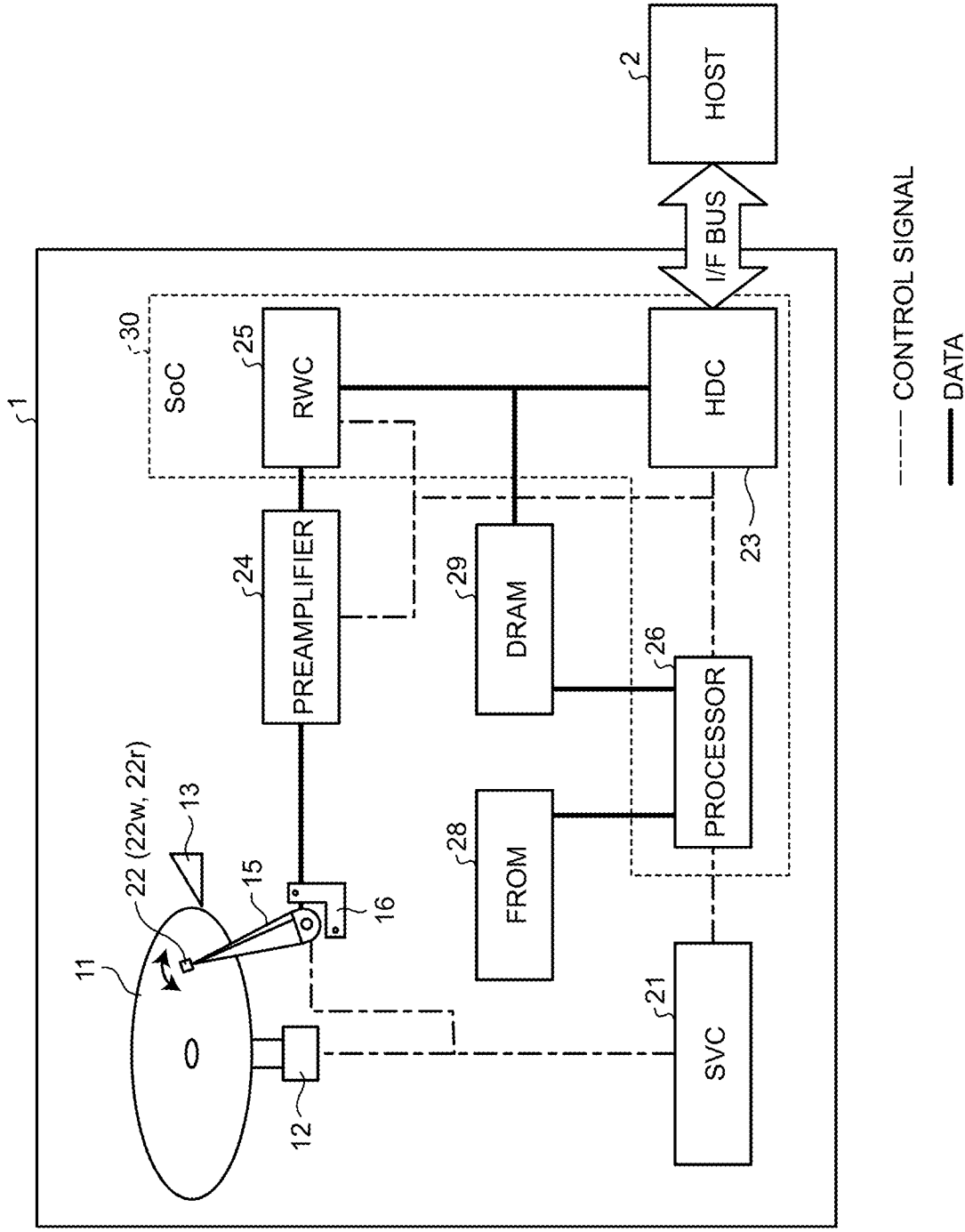
FIG. 1 is a schematic diagram illustrating an example of a configuration of a magnetic disk apparatus according to an embodiment.

FIG. 1 is a schematic diagram illustrating an example of a configuration of a magnetic disk apparatus 1 according to an embodiment.

The magnetic disk apparatus 1 is connected to a host 2. The magnetic disk apparatus 1 can receive an access command, such as a write command or a read command from the host 2.

The magnetic disk apparatus 1 includes a magnetic disk 11 having a magnetic layer formed on a surface thereof. The magnetic disk apparatus 1 accesses the magnetic disk 11 in response to the access command. The access includes writing of data and reading of data.

Data is written and read by using a magnetic head 22. Specifically, in addition to the magnetic disk 11, the magnetic disk apparatus 1 includes a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read/write channel (RWC) 25, a processor 26, a flash read only memory (FROM) 28, and a dynamic random access memory (DRAM) 29.

The magnetic disk 11 is rotated at a predetermined rotation speed by the SPM 12 that is attached coaxially.

The SVC 21 is an integrated circuit having a function as a driver that drives the SPM 12 and the VCM 16. The processor 26 controls the rotation of the SPM 12 and the rotation of the VCM 16 via the SVC 21.

The magnetic head 22 performs writing and reading to and from the magnetic disk 11 by using a write head 22w and a read head 22r provided therein. The magnetic head 22 is attached to a distal end of the actuator arm 15. The magnetic head 22 is moved in the radial direction of the magnetic disk 11 by the VCM 16 driven by the SVC 21. Note that plural write head 22w and/or plural read heads 22r may be provided in a single magnetic head 22.

When, for example, the rotation of the magnetic disk 11 is stopped, the magnetic head 22 is moved onto the ramp 13. The ramp 13 is configured to hold the magnetic head 22 at a position separated from the magnetic disk 11.

The preamplifier 24 is an integrated circuit that writes and reads data via the magnetic head 22. The preamplifier 24 amplifies and outputs a signal read from the magnetic disk 11 by the magnetic head 22 during the read operation and supplies the signal to the RWC 25. In addition, at the time of a write operation, the preamplifier 24 amplifies a signal corresponding to data to be written supplied from the RWC 25 and supplies the amplified signal to the magnetic head 22.

The HDC 23 controls transmission and reception of data with the host 2 via an I/F bus, controls the DRAM 29, and the like.

The DRAM 29 is used as a buffer for data transmitted to and received from the host 2. For example, the DRAM 29 is used for temporarily storing data to be written or storing data read from the magnetic disk 11.

Additionally, the DRAM 29 is used as an operation memory by the processor 26. The DRAM 29 is used as a region onto which a firmware program is loaded and a region in which various types of management data are temporarily stored.

The RWC 25 modulates data to be written supplied from the HDC 23 and supplies the modulated data to the preamplifier 24. In addition, the RWC 25 executes demodulation including error correction on the signal read from the magnetic disk 11 and supplied from the preamplifier 24, and then outputs the signal to the HDC 23 as digital data.

The processor 26 is, for example, a central processing unit (CPU). A flash read only memory (FROM) 28 and the DRAM 29 are connected to the processor 26.

The FROM 28 stores a firmware program, various setting information, and the like. Note that the firmware program may be stored in the magnetic disk 11.

The processor 26 performs overall control of the magnetic disk apparatus 1 in accordance with the firmware program stored in the FROM 28 or the magnetic disk 11. For example, the processor 26 loads the firmware program from the FROM 28 or the magnetic disk 11 into the DRAM 29 and controls the SVC 21, the preamplifier 24, the RWC 25, the HDC 23, and the like in accordance with the firmware program loaded onto the DRAM 29.

Note that some of or all the functions of the processor 26 may be implemented by a hardware circuit such as a field-programmable gate array (FPGA) or an application specific integrated circuit (ASIC).

The HDC 23, the RWC 25, and the processor 26 are configured as a system-on-a-chip (SoC) 30 that is one integrated circuit. In addition to these, the SoC 30 may include other elements (for example, the FROM 28 or the DRAM 29). Note that the SoC 30 is an example of a controller.

Figure 2:
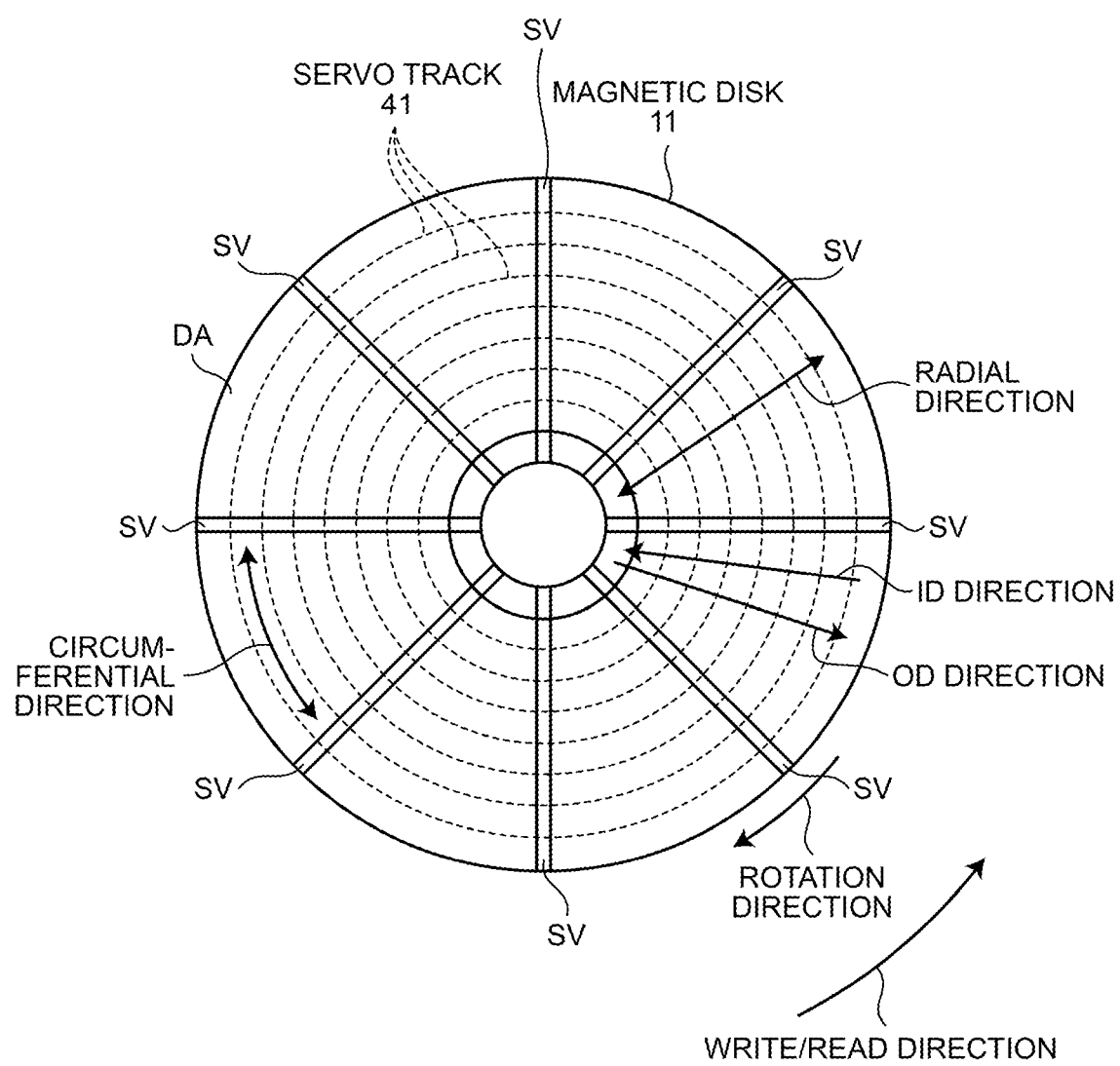
FIG. 2 is a schematic diagram illustrating an example of a configuration of a magnetic disk according to the embodiment.

FIG. 2 is a schematic diagram illustrating an example of a configuration of the magnetic disk 11 according to the embodiment. Note that this figure illustrates an example of a rotation direction of the magnetic disk 11. The magnetic head 22 moves relative to the magnetic disk 11 by the rotation of the magnetic disk 11. Therefore, a write/read direction, that is, a direction in which data is written or read by the magnetic head 22 in the circumferential direction, is a direction opposite to the rotation direction of the magnetic disk 11.

In the radial direction, a direction from the edge to the center of the magnetic disk 11 is referred to as an inner diameter (ID) direction, and a direction from the center to the edge of the magnetic disk 11 is referred to as an outer diameter (OD) direction.

Servo data used for positioning of the magnetic head 22 is written to the magnetic disk 11 by, for example, a servo writer or self-servo writing (SSW) in a manufacturing step. According to FIG. 2, as an example of the arrangement of servo regions in which the servo data is written, multiple servo regions SV are illustrated, which are arranged radially in the radial direction and at predetermined intervals in the circumferential direction. A data region DA allowing data to be written is interposed between each two of the servo regions SV, which are adjacent to each other in the circumferential direction.

Concentric servo tracks 41 are provided in the radial direction of the magnetic disk 11. The servo data written in the servo region SV is used for positioning control of the magnetic head 22.

More specifically, on the magnetic disk 11, concentric data tracks are provided above regions where the servo tracks 41 are provided. The servo tracks 41 may be used as data tracks, and data tracks that are different from the servo tracks 41 may be provided. In an area segmented by the data region DA on each data track, data sectors are arranged in a circumferential direction. Data can be written to each data sector by the magnetic head 22. Data that can be written to each data sector includes user data received from the host 2, metadata (for example, error correction code) accompanying the user data, system data, and the like. The magnetic disk apparatus 1 holds in advance the setting of the positional relationship between the servo tracks 41 and the data tracks.

The magnetic disk apparatus 1 executes positioning control for positioning the magnetic head 22 in a target data track on the basis of the servo data recorded in the servo region SV. The positioning control includes a seek operation which is an operation of moving the magnetic head 22 in the radial direction toward the target data track, a tracking operation of maintaining the magnetic head 22 on the target data track, and the like. Hereinafter, a region segmented by the servo region SV on the servo track 41 is referred to as a servo sector SV. The servo sectors SV are arranged on the servo tracks 41 at intervals in the circumferential direction.

Figure 3:
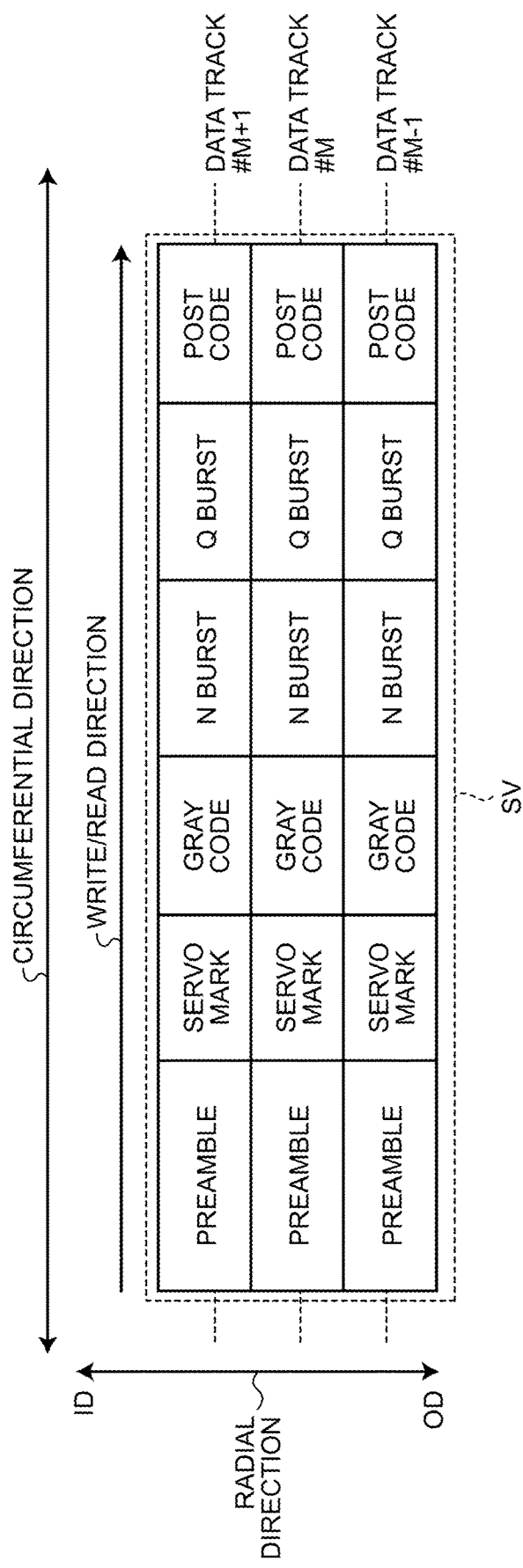
FIG. 3 is a diagram illustrating an example of servo data recorded in a servo sector of the embodiment.

FIG. 3 is a diagram illustrating an example of servo data recorded in the servo sector SV of the embodiment. Here, it is assumed that one servo sector SV has a width corresponding to about three data tracks in the radial direction. In this drawing, the configuration of the servo sector SV across the three data tracks #M−1, #M, and #M+1 is illustrated.

As illustrated in FIG. 3, preambles, servo marks, gray codes, N bursts, Q bursts, and post codes are recorded in the servo sector SV in this order in the write/read direction.

The preamble is pattern data of a single period that periodically changes in the circumferential direction. The preamble is used for adjusting the amplitude, the phase, and the frequency of sampling data when a servo waveform read by the read head 22r is taken into the RWC 25 as the sampling data on the basis of a servo clock.

The servo mark is pattern data for determining a demodulation timing of the servo data. On the basis of the servo mark detection timing, the SoC 30 determines the demodulation timings of various pieces of servo data that are read by the read head 22r after the servo mark.

The gray code includes a cylinder address used for identifying each servo track 41 provided on the magnetic disk 11 and a sector address used for identifying each servo sector SV on the servo track 41.

The N burst and the Q burst are pattern data used for detecting a positional deviation amount of the servo track 41 indicated by the cylinder address included in the gray code from a track center. The positional deviation amount of the servo track 41 from the track center is referred to as a burst offset.

Figure 4:
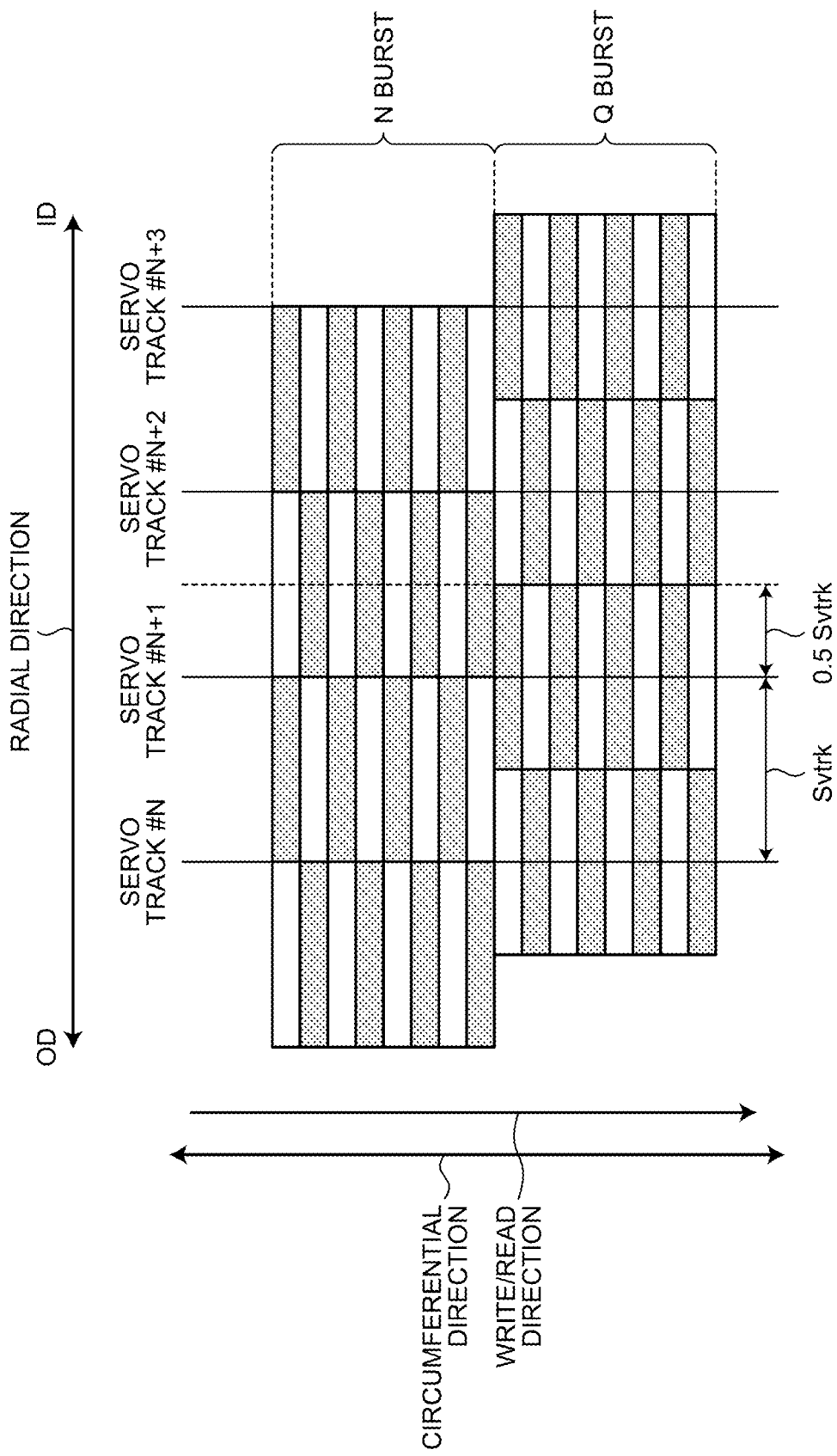
FIG. 4 is a schematic diagram illustrating an example of configurations of an N burst and a Q burst recorded in servo sectors of the embodiment.

FIG. 4 is a schematic diagram illustrating an example of configurations of an N burst and a Q burst recorded in the servo sector SV of the embodiment. In this figure, a dot-hatched pattern indicates one of two values having different polarities (for example, magnetization with positive (+) polarity), and a white pattern indicates the other of the two values (for example, magnetization with negative (−) polarity).

The length in the radial direction may be expressed in a unit of servo track, in other words, in a unit of spatial length by which a servo track pitch is regarded as 1. Such a unit of the spatial length by which a servo track pitch is regarded as 1 is denoted as Svtrk.

In the example illustrated in FIG. 4, each of the N burst and the Q burst has a configuration in which the polarity is reversed at predetermined length intervals in the circumferential direction. In the radial direction, the polarity of each of the N burst and the Q burst is reversed every one Svtrk. Additionally, the N burst is recorded such that the maximum amplitude is obtained at a position offset from the track center by 0.5 Svtrk. In addition, the Q burst is recorded so as to obtain the maximum amplitude at the track center.

The RWC 25 takes in a burst pattern (for each of an N burst and a Q burst) at a sampling interval based on a servo clock. The RWC 25 executes, for example, discrete Fourier transform (DFT) processing on the burst sampling waveform obtained as a result and obtains a sine component and a cosine component of the burst frequency, or a phase and an amplitude. Here, as an example, the RWC 25 is described as obtaining a phase and an amplitude. Hereinafter, the burst sampling waveform is subjected to DFT processing, and the obtained phase and amplitude of the burst frequency may be referred to as the phase and the amplitude of the demodulated signal of the burst pattern.

The SoC 30 (for example, the processor 26) calculates a burst offset on the basis of the phase and the amplitude of the demodulated signal of the burst pattern. The burst offset is an offset amount from one servo track 41. The SoC 30 calculates the position of the magnetic head 22 in the radial direction on the basis of the cylinder address and the burst offset.

The description refers back to FIG. 3. The shape of the track (the data track and the servo track 41) is ideally a perfect circle. However, the servo track 41 is distorted due to vibration received at the time of writing the servo data, servo pattern qualities, or the like. Therefore, the position (radial position) of the servo track 41 in the radial direction that is specified on the basis of the combination of the cylinder address and the burst offset may deviate from the radial position of the servo track 41 with the ideal shape. Since this positional deviation is repeatedly generated in the same manner with one rotation of the magnetic disk 11 (and the SPM 12) as one cycle, the positional deviation is referred to as repeatable run-out (RRO). The post code is obtained by coding the correction amount of the RRO.

The SoC 30 (for example, the processor 26) executes correction using the RRO correction amount recorded as the post code on the radial position of the magnetic head 22 obtained by the combination of the cylinder address and the burst offset, thereby obtaining the radial position of the magnetic head 22 in which the positional deviation due to the RRO is canceled. The correction using the RRO correction amount is referred to as RRO correction.

Figure 5:
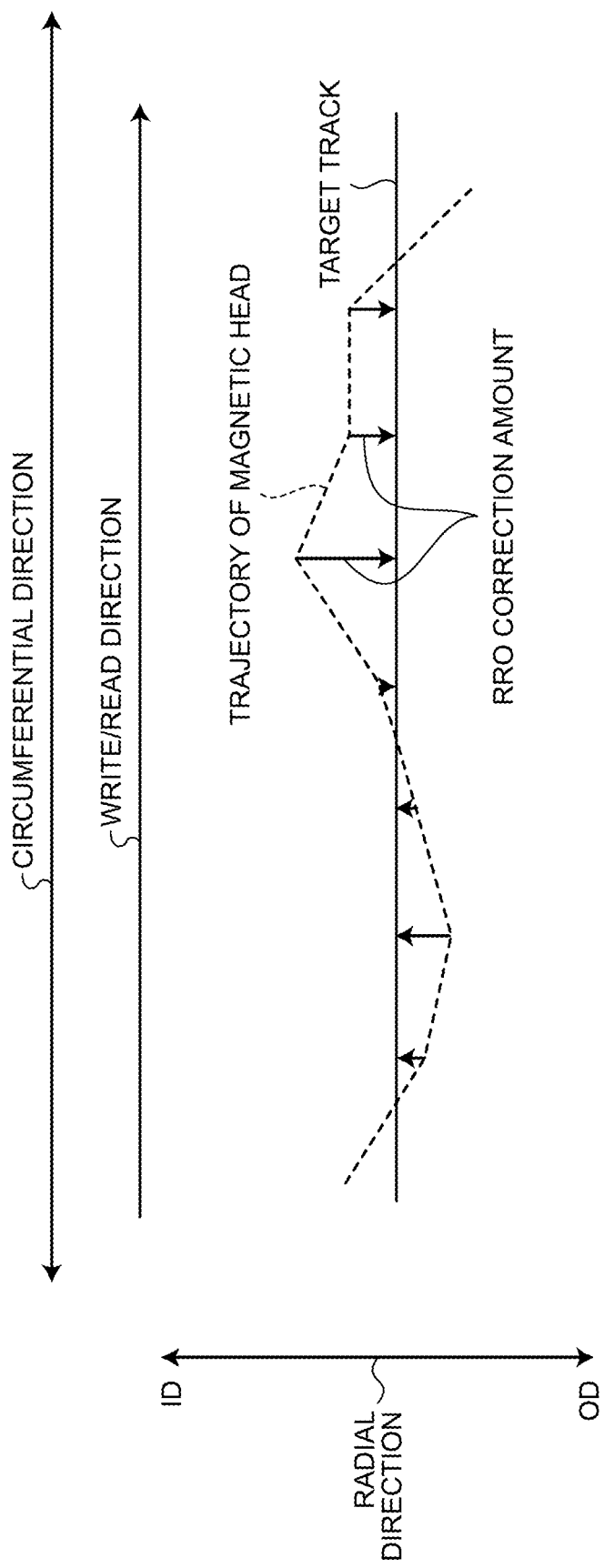
FIG. 5 is a diagram illustrating an example of a learning method of an RRO correction amount.

FIG. 5 is a diagram illustrating an example of a learning method of an RRO correction amount.

In the manufacturing step of the magnetic disk apparatus 1, after the gray code or the burst pattern is written, the RRO correction amount is learned. In the step of learning the RRO correction amount, the servo tracks 41 or data tracks are sequentially set as target tracks, and for each target track, a difference between an actual radial position of the magnetic head 22 and a radial position of the target track is measured under positioning control based on a gray code and a burst pattern.

Specifically, the SoC 30 reads the gray code and the burst pattern by the read head 22r and estimates the position of the magnetic head 22 on the basis of the read gray code and burst pattern. The SoC 30 then positions the magnetic head 22 on the target track on the basis of the estimated position of the magnetic head 22. Meanwhile, the SoC 30 obtains the deviation amount of the estimated position of the magnetic head 22 from the target track as the RRO correction amount.

The dotted line illustrated in FIG. 5 is a trajectory followed by the magnetic head 22 observed under the control of positioning to a target track in the step of learning the RRO correction amount. The SoC 30 obtains the position of the magnetic head 22, for example, every time the magnetic head 22 passes over the servo sector SV. Therefore, the observed trajectory has a shape like polygonal lines as illustrated in FIG. 5. The SoC 30 obtains the deviation amount of the position of the magnetic head 22 in each servo sector SV from the target track in the radial direction as the RRO correction amount in each servo sector SV. The SoC 30 records each RRO correction amount as a post code in the corresponding servo sector SV.

Note that the learning method of the RRO correction amount described with reference to FIG. 5 is merely an example. The method of calculating the RRO correction amount in each servo sector SV from the observed trajectory can be variously changed.

Hereinafter, the phase and the amplitude of the demodulated signal of burst patterns obtained by demodulation of the burst patterns are referred to as a burst demodulated value set. The burst demodulated value set contains the phase and the amplitude of an N-burst demodulated signal and the phase and the amplitude of a Q-burst demodulated signal.

The estimated position of the magnetic head 22 that is obtained by adding the burst offset to the cylinder address is referred to as a first servo demodulation position. The first servo demodulation position after the RRO correction, which is the estimated position of the magnetic head 22 finally used for positioning, is referred to as a second servo demodulation position.

An example of a method for increasing the storage capacity of the magnetic disk apparatus is minimization of the interval of the data track in the radial direction, namely, the track pitch of the data track. If a position error (hereinafter, the position error is described as a position error RPE: Repeatable Position Error synchronized with rotation, which does not include NRPE: Non Repeatable Position Error) between the magnetic head and the target track can be minimized by controlling the position of a magnetic head such that the magnetic head does not follow the RRO, the track pitch of the data track can be reduced to increase the storage capacity of the magnetic disk apparatus. In a case where the RRO can be completely corrected, the error RPE between the position of the magnetic head and the target track can be set to 0. As a result, it is not necessary to provide a margin for compensating data in consideration of the position error RPE. Therefore, multiple data tracks can be set at equal intervals in the radial direction, and the capacity loss due to the position error RPE can be made zero.

Note that the observed position error RPE may vary between a state where a write operation is being executed and a state where a non-write operation is being executed.

The write operation is an operation of writing data to a data sector while positioning the magnetic head 22. In the write operation, reading of a servo sector SV is executed when the magnetic head 22 passes over this servo sector SV, and writing of data to a data sector is executed when the magnetic head 22 passes over this data sector.

The non-write operation is an operation of positioning the magnetic head 22 without performing writing of data to a data sector. Various operations correspond to the non-write operation.

For example, a read operation of reading data from a data sector corresponds to the non-write operation. In the read operation, reading of a servo sector SV is executed when the magnetic head 22 passes over this servo sector SV, and data is read from a target data sector when the magnetic head 22 passes over this target data sector.

When starting the write operation, the SoC 30 executes a seek operation to move the magnetic head 22 toward the target data track and positions the magnetic head 22 on this target data track. When the positioning of the magnetic head 22 on the target data track is completed and the magnetic head 22 reaches one of target data sectors in the target track, the SoC 30 starts the write operation. Some of or all the operations involving positioning before the start of the write operation correspond to the non-write operation.

As a technology for enabling high-quality writing, a dynamic flying height (DFH) technology has been known. According to the DFH technology, the flying height of the magnetic head can be adjusted. Then, during the write operation, the flying height of the magnetic head is controlled to a predetermined small value. Specifically, before the start of the write operation, control for setting the flying height of the magnetic head to a predetermined small value is started, and then the write operation is started. The operation from when the flying height of the magnetic head is controlled to a predetermined small value to when the write operation is started corresponds to the non-write operation.

In addition, in the step of learning the RRO correction amount described above, any data is not written in the operation of reading servo data from each servo sector SV. In the step of learning the RRO correction amount described above, the operation of positioning the magnetic head 22 corresponds to the non-write operation.

Figure 6:
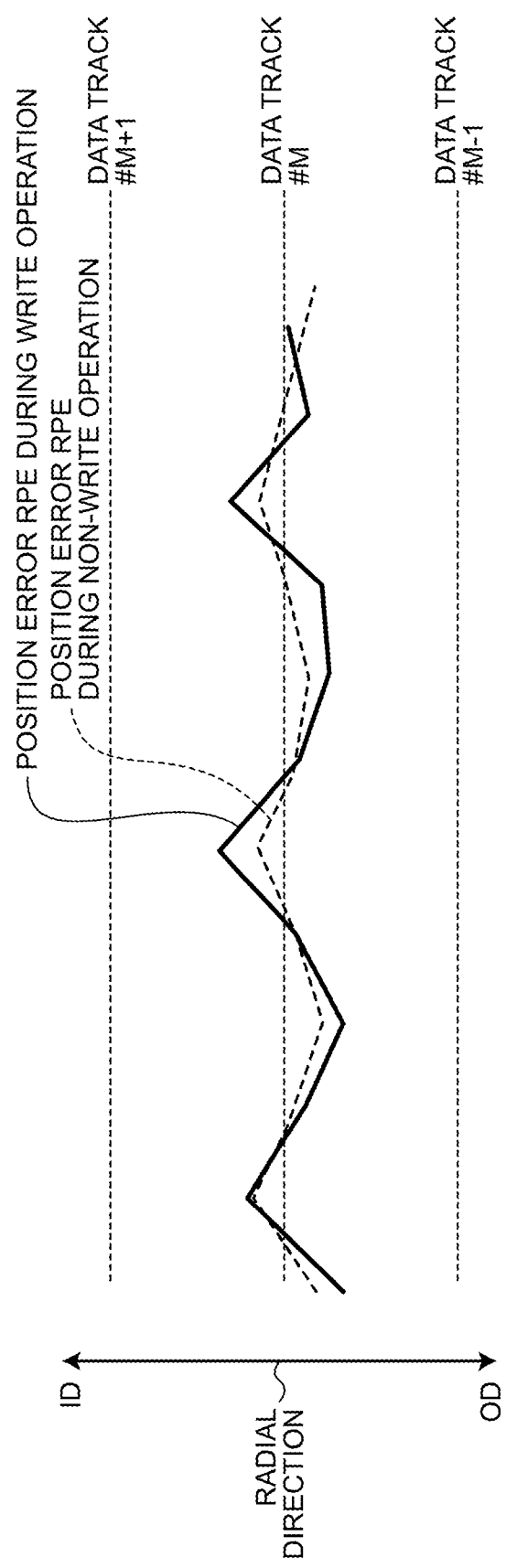
FIG. 6 is a diagram illustrating an example of a position error observed during each of a write operation and a non-write operation.

FIG. 6 is a diagram illustrating an example of the position error RPE observed during each of the write operation and the non-write operation. In this figure, the position error RPE observed in each operation when the magnetic head 22 is positioned in the data track #M out of the three data tracks (Data track #M−1, Data track #M, Data track #M+1) arranged in the radial direction is drawn. As illustrated in this figure, it can be seen that the position error RPE observed during the write operation is worse than the position error RPE observed during the non-write operation.

The reason that the position error RPE observed during the write operation is worse than the position error RPE observed during the non-write operation is as follows. When the servo demodulation position calculated on the basis of the burst demodulated value set during the write operation is corrected by using the RRO correction amount calculated on the basis of the burst demodulated value set during the non-write operation, the RRO correction value may not be appropriate. The reason that the RRO correction value does not become appropriate is that, the burst demodulated value set during the write operation may be different from the burst demodulated value set during the non-write operation. The servo demodulation position is a result of calculation on the basis of a predetermined calculation equation for a burst demodulated value set. Therefore, changing the burst demodulated value set means changing the servo demodulation position. In short, the RROs look different. The reason that the burst demodulated value set is different between during the write operation and during the non-write operation is that, a transient response (the flying height and the temperature of a magnetic head, the magnetic field leaked from a write head, and time for stabilizing the read output) at the time of transition from a state of writing data to a state of reading servo data affects reading of a burst waveform.

In the embodiment, during the write operation, the SoC 30 corrects the burst demodulated value set obtained during the write operation to be closer to the burst demodulated value set obtained during the non-write operation. With this configuration, deterioration of the position error RPE during the write operation is suppressed.

Hereinafter, the burst demodulated value set obtained by the positioning control during the non-write operation may be referred to as a burst demodulated value set during the non-write operation, and the burst demodulated value set obtained by the positioning control during the write operation may be referred to as a burst demodulated value set during the write operation.

Figure 7:
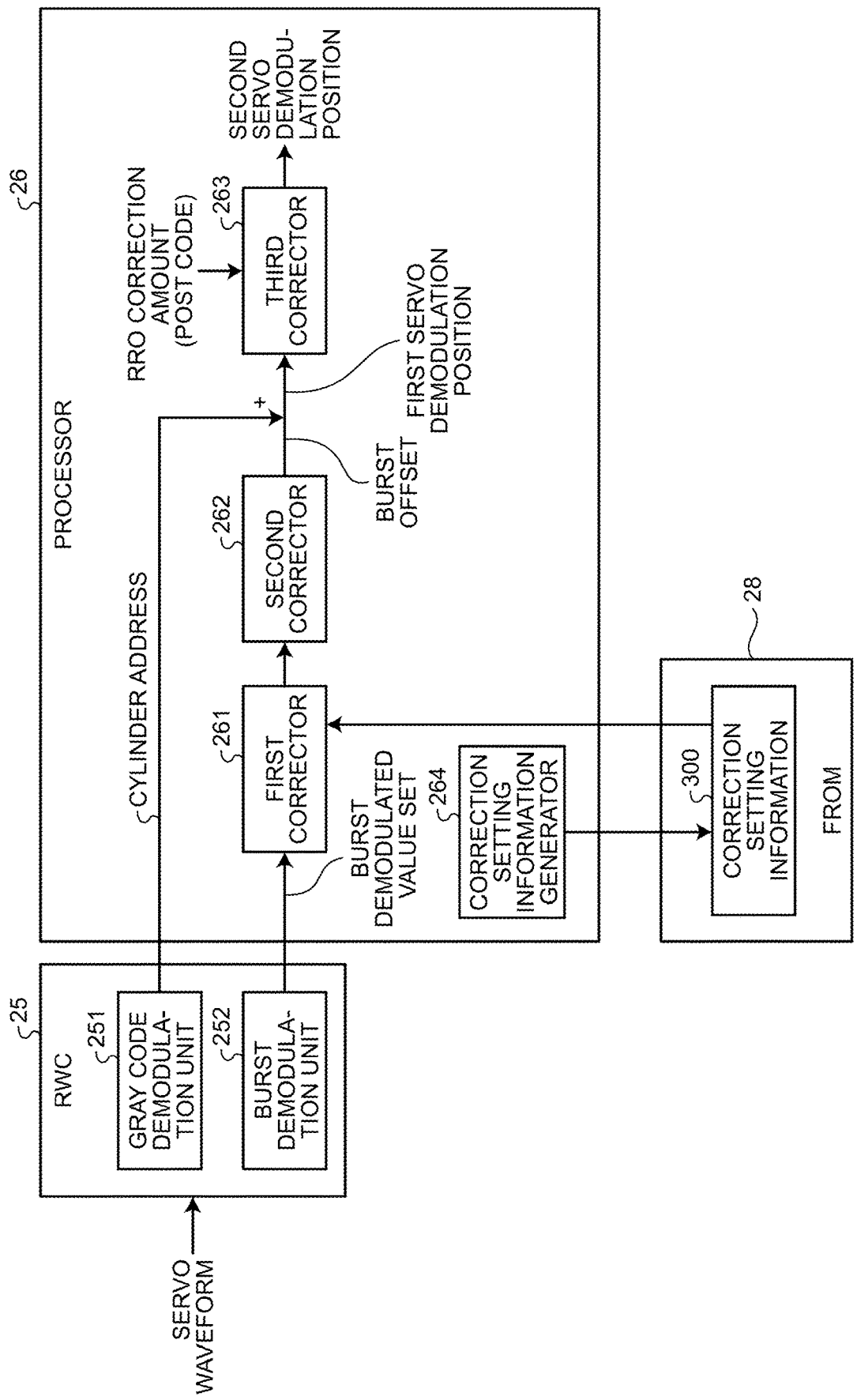
FIG. 7 is a schematic diagram illustrating an example of a functional configuration related to positioning control of the magnetic disk apparatus according to the embodiment.

FIG. 7 is a schematic diagram illustrating an example of a functional configuration related to positioning control of the magnetic disk apparatus 1 according to the embodiment.

The RWC 25 includes a gray code demodulation unit 251 and a burst demodulation unit 252. The processor 26 functions as a first corrector 261, a second corrector 262, a third corrector 263, and a correction setting information generator 264, in accordance with the firmware program.

A servo waveform is input from the preamplifier 24 to the RWC 25.

The gray code demodulation unit 251 decodes the gray code waveform included in the input servo waveform to obtain the cylinder address. The burst demodulation unit 252 executes demodulation, namely, the DFT processing on the burst waveform included in the input servo waveform to obtain a burst demodulated value set.

During the write operation, the first corrector 261 uses correction setting information 300 generated in advance to correct the burst demodulated value set to be closer to the burst demodulated value set during the non-write operation. Then, the first corrector 261 outputs the corrected burst demodulated value set to the second corrector 262.

During the non-write operation, the first corrector 261 outputs the burst demodulated value set to the second corrector 262 without correcting the burst demodulated value set.

The second corrector 262 calculates a burst offset on the basis of the input burst demodulated value set. The burst offset is added to the cylinder address to obtain the first servo demodulation position.

The third corrector 263 obtains the second servo demodulation position by correcting the first servo demodulation position on the basis of the RRO correction amount and outputs the second servo demodulation position.

The correction setting information generator 264 generates the correction setting information 300. The correction setting information 300 is numerical information used as an argument of a correction algorithm. The correction algorithm serves to bring the burst demodulated value set, which is obtained during the write operation, close to the burst demodulated value set during the non-write operation. Details of the correction setting information 300 and the correction algorithm will be described later.

The correction setting information 300 generated by the correction setting information generator 264 is stored in a predetermined memory. Here, the memory in which the correction setting information 300 is stored is assumed to be the FROM 28 as an example. The memory in which the correction setting information 300 is stored is not limited thereto. The correction setting information 300 may be stored in a system area provided in the magnetic disk 11 or may be stored in each servo sector SV. The correction setting information 300 may be stored in a non-volatile memory different from both the magnetic disk 11 and the FROM 28. In addition, during the operation, the correction setting information 300 may be loaded into the DRAM 29, and the processor 26 may use the correction setting information 300 loaded into the DRAM 29.

In the above description, the first corrector 261, the second corrector 262, the third corrector 263, and the correction setting information generator 264 are implemented by the processor 26. Alternatively, some of or all these functional components may be implemented by a hardware circuit such as an FPGA or an ASIC.

In addition, some of or all these functional components may be provided in an integrated circuit other than the processor 26, such as the RWC 25.

Next, details of the operation of the magnetic disk apparatus 1 of the embodiment and details of processing of some functional components will be described.

Figure 8:
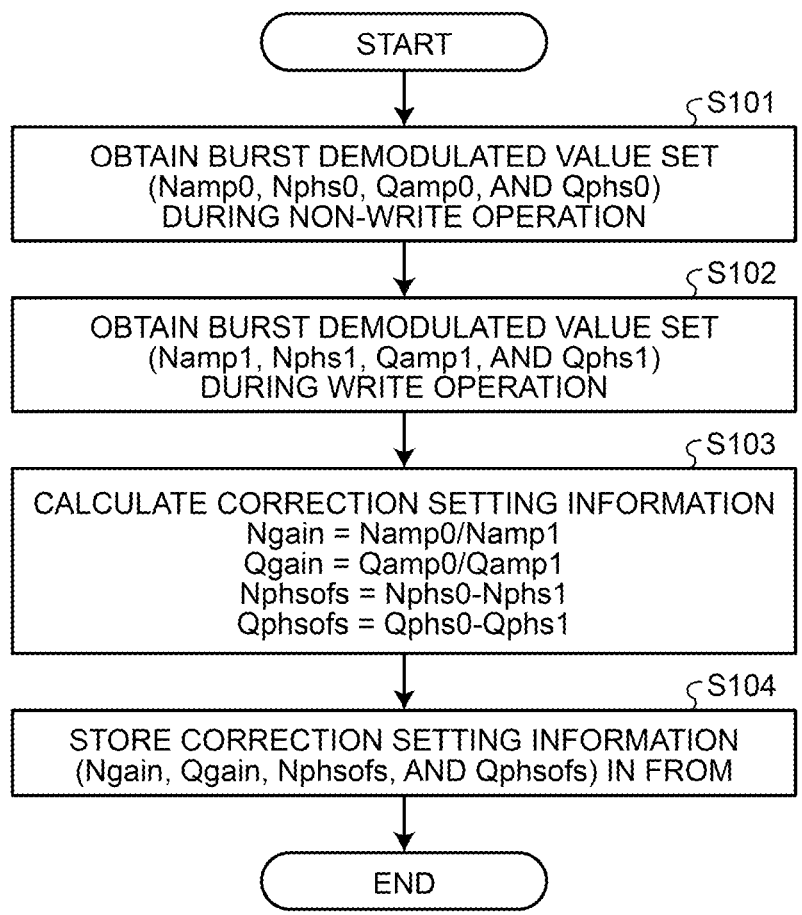
FIG. 8 is a flowchart illustrating an example of an operation of generating correction setting information according to the embodiment.

FIG. 8 is a flowchart illustrating an example of an operation of generating the correction setting information 300 according to the embodiment. Here, an example in which the correction setting information 300 related to an optional servo sector SV (referred to as a target servo sector SV) is generated will be described. Note that the series of processes illustrated in this figure is executed, for example, after learning and recording of the RRO are completed in the manufacturing step. Note that the execution timing of the series of processes is not limited thereto. The series of processes may be executed after shipment of the magnetic disk apparatus 1.

First, the correction setting information generator 264 executes the non-write operation on the servo track 41 including the target servo sector SV or the data track, and obtains the burst demodulated value set during the non-write operation related to the target servo sector SV (S101). Specifically, the correction setting information generator 264 demodulates the burst patterns in the positioning while positioning the magnetic head 22 without writing to the data region DA, and obtains the burst demodulated value set obtained by the demodulation as the burst demodulated value set during the non-write operation. In the burst demodulated value set during the non-write operation obtained by the processing of S101, the amplitude of the N-burst demodulated signal is expressed as Namp0, the phase of the N-burst demodulated signal is expressed as Nphs0, the amplitude of the Q-burst demodulated signal is expressed as Qamp0, and the phase of the Q-burst demodulated signal is expressed as Qphs0.

Subsequently, the correction setting information generator 264 executes the write operation on the servo track 41 including the target servo sector SV or the data track, and obtains the burst demodulated value set during the write operation related to the target servo sector SV (S102). Specifically, the correction setting information generator 264 demodulates the burst patterns in the positioning while positioning the magnetic head 22 together with writing to the data region DA and obtains the burst demodulated value set obtained by the demodulation as the burst demodulated value set during the write operation. In the burst demodulated value set during the write operation obtained by the process of S102, the amplitude of the N-burst demodulated signal is expressed as Namp1, the phase of the N-burst demodulated signal is expressed as Nphs1, the amplitude of the Q-burst demodulated signal is expressed as Qamp1, and the phase of the Q-burst demodulated signal is expressed as Qphs1.

Subsequently, the correction setting information generator 264 calculates correction setting information 300 related to the target servo sector SV (S103). The correction setting information generator 264 calculates the correction setting information 300 on the basis of Equations (1) to (4).

$$Ngain = Namp0/Namp1 \qquad (1)$$

$$Qgain = Qamp0/Qamp1 \qquad (2)$$

-continued $$Nphsofs = Nphs0 - Nphs1 \quad (3)$$

$$Qphsofs = Qphs0 - Qphs1 \quad (4)$$

In this example, the correction setting information 300 is a set that is constituted by an amplitude ratio Ngain of the N-burst demodulated signal, an amplitude ratio Qgain of the Q-burst demodulated signal, a phase difference Nphsofs of the N-burst demodulated signal, and a phase difference Qphsofs of the Q-burst demodulated signal.

Subsequently, the correction setting information generator 264 stores the correction setting information 300 obtained by the calculation in the FROM 28 (S104). Then, the operation of generating the correction setting information 300 related to the target servo sector SV ends.

Note that the series of processes illustrated in FIG. 8 is executed for each of the servo sectors SV of the magnetic disk 11. In such a case, the correction setting information 300 is generated and stored for each servo sector SV.

One piece of the correction setting information 300 is used for positioning of one corresponding servo sector SV. However, one piece of the correction setting information 300 may be shared by two or more servo sectors SV.

For example, the correction setting information generator 264 averages, in the group of servo sectors SV, each of the burst demodulated value set during the non-write operation and the burst demodulated value set during the write operation. Then, the correction setting information generator 264 calculates the correction setting information 300 on the basis of the burst demodulated value set during the non-write operation averaged in the group of servo sectors SV and the burst demodulated value set during the write operation averaged in the group of servo sectors SV. Then, also in positioning in any servo sector SV in the group of servo sectors SV, the first corrector 261 uses the correction setting information 300 generated from the group of servo sectors SV.

Alternatively, the correction setting information generator 264 executes the processes of S101 to S104 for each servo sector SV. Then, the correction setting information generator 264 averages the correction setting information 300 generated for each servo sector SV in the group of the servo sectors SV. Then, the first corrector 261 uses the correction setting information 300 averaged in the group of servo sectors SV in positioning in any servo sector SV in the group of servo sectors SV.

As described above, by sharing one piece of correction setting information 300 by the group of servo sectors SV, it is possible to suppress the capacity for storing the correction setting information 300 and to suppress the time for reading the correction setting information 300 at the time of positioning.

Note that the group of servo sectors SV by which one piece of the correction setting information 300 is shared can be determined in any manner. One servo track 41 or all servo sectors SV included in the data track may share one piece of the correction setting information 300. The recording surface of the magnetic disk 11 may be divided into two or more zones arranged in the radial direction, and one piece of the correction setting information 300 may be shared by all servo sectors SV included in each zone.

In other words, the correction setting information generator 264 may calculate one piece of the correction setting information 300 for each two or more servo sectors SV and store the information in the FROM 28 or may calculate one piece of the correction setting information 300 for each two or more servo tracks 41 or data tracks and store the information in the FROM 28.

Figure 9:
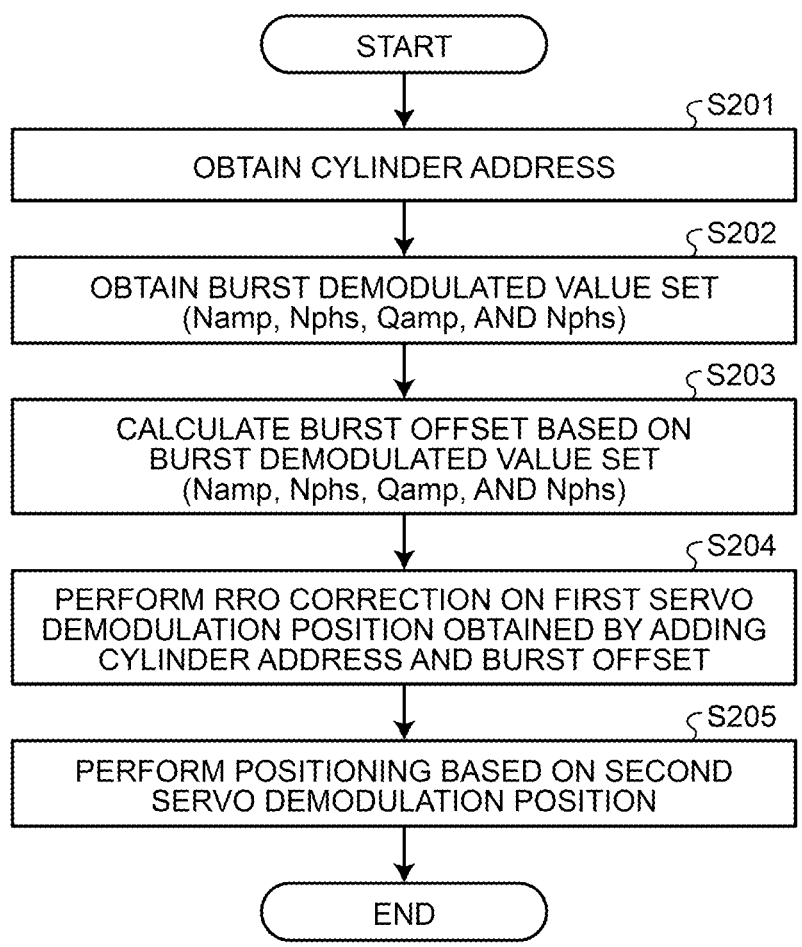
FIG. 9 is a flowchart illustrating an example of a positioning operation during the non-write operation.

FIG. 9 is a flowchart illustrating an example of a positioning operation during the non-write operation. Here, an operation when the magnetic head 22 passes over a servo sector SV during the non-write operation will be described.

First, the gray code demodulation unit 251 obtains a cylinder address (S201). Subsequently, the burst demodulation unit 252 obtains a burst demodulated value set (S202). In the obtained burst demodulated value set, the amplitude of the N-burst demodulated signal is expressed as Namp, the phase of the N-burst demodulated signal is expressed as Nphs, the amplitude of the Q-burst demodulated signal is expressed as Qamp, and the phase of the Q-burst demodulated signal is expressed as Qphs.

The first corrector 261 outputs the burst demodulated value set obtained by the process of S202 to the second corrector 262.

The second corrector 262 calculates a burst offset on the basis of the burst demodulated value set, namely, the set containing Namp, Nphs, Qamp, and Qphs (S203).

An optional algorithm can be used as the algorithm used by the second corrector 262 for calculating the burst offset on the basis of the burst demodulated value set. An example of the algorithm for calculating the burst offset on the basis of the burst demodulated value set will be described.

The second corrector 262 calculates a burst offset BstPos1 by using Equations (5) to (10). In the present disclosure, a sign "*" denotes an operator that represents multiplication.

$$Nbst1 = Namp * \sin(Nphs + PhsCmp) \quad (5)$$

$$Qbst1 = Qamp * \sin(Qphs + PhsCmp) \quad (6)$$

$$Nbst2 = \cos(AzmCmp) * Nbst1 - \sin(AzmCmp) * Qbst1 \quad (7)$$

$$Qbst2 = \sin(AzmCmp) * Nbst1 + \cos(AzmCmp) \times Qbst1 \quad (8)$$

$$BstPos0 = \arctan(Qbst2/Nbst2) \quad (9)$$

$$BstPos1 = BstPos0 + TableCmp \quad (10)$$

The processes expressed by Equations (5) and (6) are referred to as initial phase correction. PhsCmp is a correction value of the initial phase correction, namely, an initial phase correction value. The initial phase correction value is adjusted such that the amplitudes Namp and Qamp in the burst demodulated value set are maximized. Nbst1 and Qbst1 are burst data after initial phase correction.

The processes expressed by Equations (7) and (8) are referred to as rotation correction. AzmCmp is a value for correcting the burst data after the initial phase correction and is a rotation correction value. Nbst2 and Qbst2 are burst data after rotation correction.

Equation (9) represents a process of calculating a phase angle represented by the points of the rotation-corrected burst data Nbst2 and Qbst2 in a case where the horizontal axis represents the N-burst data axis, and the vertical axis represents the Q-burst data axis. Since a phase angle of 360 degrees corresponds to a distance of 2 Svtrk, the phase obtained by Equation (9) can be considered to represent a burst offset. The phase obtained by Equation (9) is expressed as a burst offset BstPos0. Note that the phase angle of +180 degrees can be calculated as a burst offset of +1 Svtrk.

Equation (10) is calculation for correcting a part of the deviation of the burst offset from the target track and is referred to as table correction. TableCmp is a table correction value adjusted for the burst offset BstPos0 obtained by the calculation of Equation (9). BstPos1 obtained by the calculation of Equation (10) is the burst offset after table correction. The second corrector 262 outputs the burst offset BstPos1.

In the processor 26, the burst offset BstPos1 is added to the cylinder address obtained by the gray code demodulation unit 251. The third corrector 263 performs the RRO correction on the first servo demodulation position obtained by adding the burst offset BstPos1 and the cylinder address (S204). The second servo demodulation position is obtained by the RRO correction on the first servo demodulation position.

By using the second servo demodulation position as the current position of the magnetic head 22, the processor 26 performs positioning of bringing the magnetic head 22 closer to the target data track (S205). Then, an operation when the magnetic head 22 passes over a servo sector SV during the non-write operation ends. The SoC 30 can position the magnetic head 22 on the target data track by repeatedly executing the processes of S201 to S205 during the non-write operation.

Figure 10:
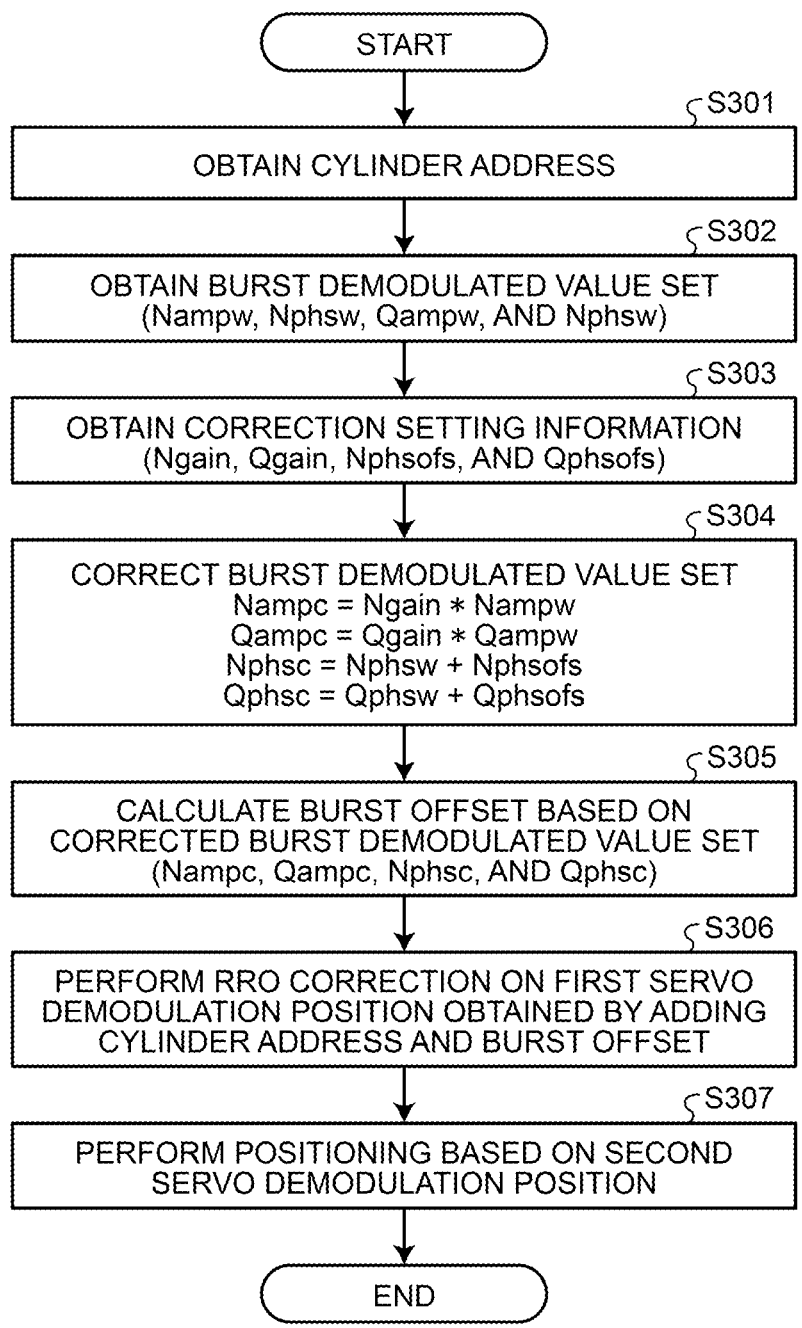
FIG. 10 is a flowchart illustrating an example of a positioning operation during the write operation.

FIG. 10 is a flowchart illustrating an example of a positioning operation during the write operation. Here, an operation when the magnetic head 22 passes over a servo sector SV during the write operation will be described.

First, the gray code demodulation unit 251 obtains a cylinder address (S301). Subsequently, the burst demodulation unit 252 obtains a burst demodulated value set (S302). In the obtained burst demodulated value set, the amplitude of the N-burst demodulated signal is expressed as Nampw, the phase of the N-burst demodulated signal is expressed as Nphsw, the amplitude of the Q-burst demodulated signal is expressed as Qampw, and the phase of the Q-burst demodulated signal is expressed as Qphsw.

The first corrector 261 obtains the correction setting information 300, namely, a set containing Ngain, Qgain, Nphsofs, and Qphsofs (S303). Then, the first corrector 261 corrects the burst demodulated value set, namely, the set containing Nampw, Nphsw, Qampw, and Qphsw, by using the correction setting information 300 as an argument of the correction algorithm (S304). The first corrector 261 corrects the burst demodulated value set by using a correction algorithm expressed by Equations (11) to (14).

$$Nampc = Ngain * Nampw \quad (11)$$
$$Qampc = Qgain * Qampw \quad (12)$$
$$Nphsc = Nphsw + Nphsofs \quad (13)$$
$$Qphsc = Qphsw + Qphsofs \quad (14)$$

Nampc is the corrected amplitude Nampw of the N-burst demodulated signal. Qampc is the corrected amplitude Qampw of the Q-burst demodulated signal. Nphsc is a corrected phase Nphsw of the N-burst demodulated signal. Qphsc is a corrected phase Qphsw of the Q-burst demodulated signal.

The first corrector 261 outputs the corrected burst demodulated value set obtained by the process of S304 to the second corrector 262.

The second corrector 262 calculates a burst offset on the basis of the input burst demodulated value set, namely, the set containing Nampc, Nphsc, Qampc, and Qphsc (S305).

The second corrector 262 calculates the burst offset BstPos1 on the basis of an algorithm similar to the algorithm used in the process of S203 illustrated in FIG. 9.

In the processor 26, the burst offset BstPos1 is added to the cylinder address obtained by the gray code demodulation unit 251. The third corrector 263 performs the RRO correction on the first servo demodulation position obtained by adding the burst offset BstPos1 and the cylinder address (S306). The second servo demodulation position is obtained by the RRO correction on the first servo demodulation position.

By using the second servo demodulation position as the current position of the magnetic head 22, the processor 26 performs positioning of bringing the magnetic head 22 closer to the target data track (S307). Then, an operation when the magnetic head 22 passes over a servo sector SV during the write operation ends. The SoC 30 can position the magnetic head 22 on the target data track by repeatedly executing the processes of S301 to S307 during the write operation.

Next, a more specific example of the correction setting information 300 and an effect of correction using the correction setting information 300 will be described.

Figure 11:
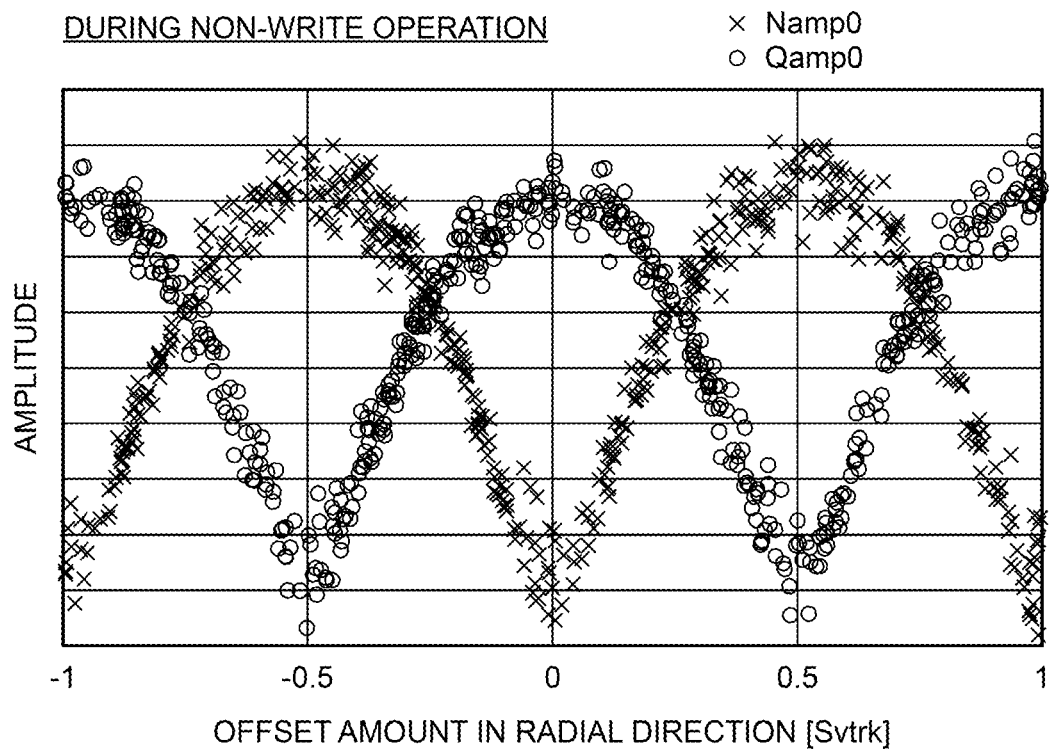
FIG. 11 is a diagram illustrating an example of an amplitude of an N-burst demodulated signal and an amplitude of a Q-burst demodulated signal in a burst demodulated value set during the non-write operation.

FIG. 11 is a diagram illustrating an example of an amplitude Namp0 of the N-burst demodulated signal and an amplitude Qamp0 of the Q-burst demodulated signal in the burst demodulated value set during the non-write operation obtained by the process of S101 illustrated in FIG. 8. In this figure, the horizontal axis represents an offset amount from a servo track 41 in the radial direction, and the vertical axis represents an amplitude.

Figure 12:
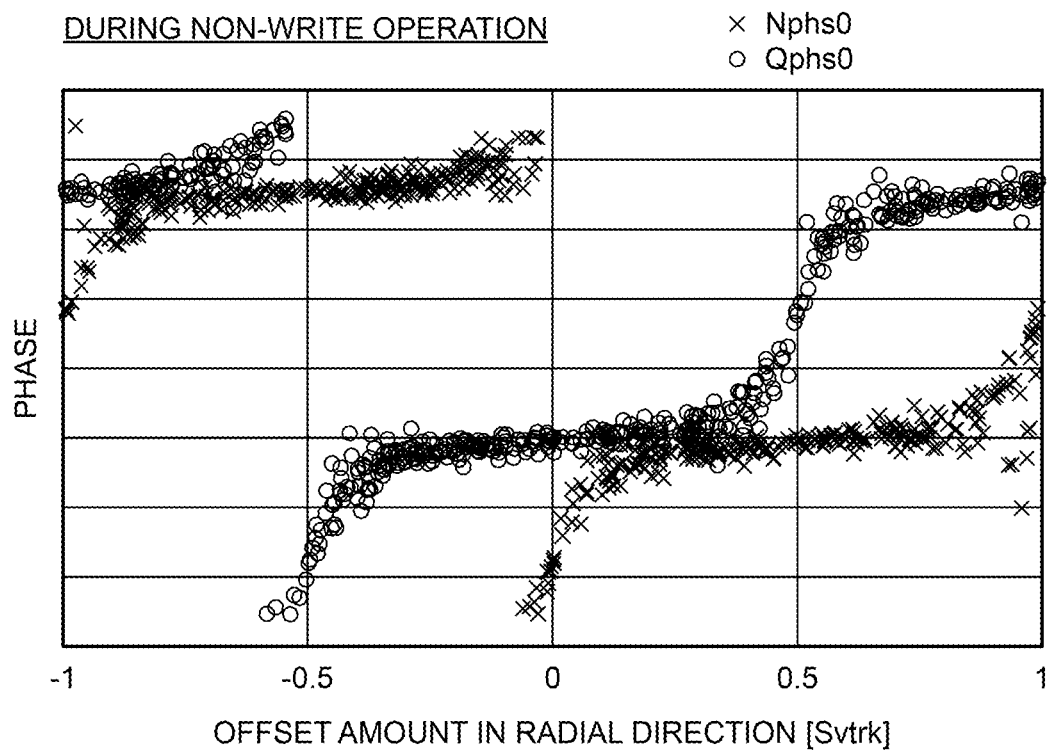
FIG. 12 is a diagram illustrating an example of a phase of the N-burst demodulated signal and a phase of the Q-burst demodulated signal in the burst demodulated value set during the non-write operation.

FIG. 12 is a diagram illustrating an example of a phase Nphs0 of the N-burst demodulated signal and a phase Qphs0 of the Q-burst demodulated signal in the burst demodulated value set during the non-write operation obtained by the process of S101 illustrated in FIG. 8. In this figure, the horizontal axis represents an offset amount from a servo track 41 in the radial direction, and the vertical axis represents a phase.

Figure 13:
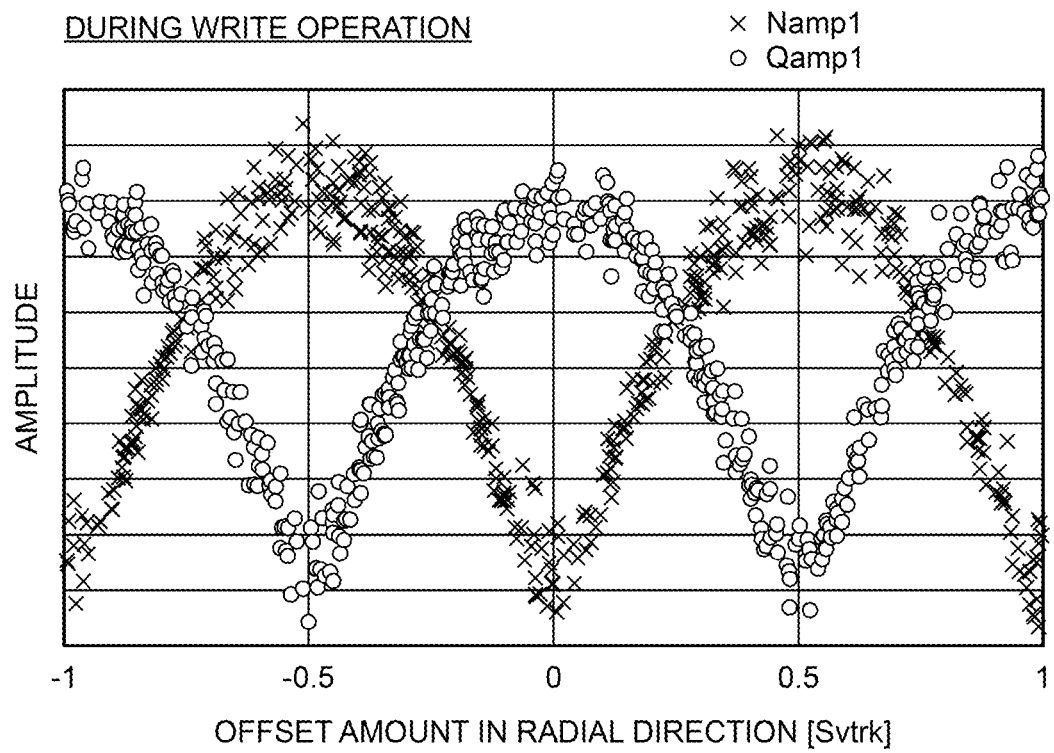
FIG. 13 is a diagram illustrating an example of an amplitude of the N-burst demodulated signal and an amplitude of the Q-burst demodulated signal in a burst demodulated value set during the write operation.

FIG. 13 is a diagram illustrating an example of an amplitude Namp1 of the N-burst demodulated signal and an amplitude Qamp1 of the Q-burst demodulated signal in the burst demodulated value set during the write operation obtained by the process of S102 illustrated in FIG. 8. In this figure, the horizontal axis represents an offset amount from a servo track 41 in the radial direction, and the vertical axis represents an amplitude.

Figure 14:
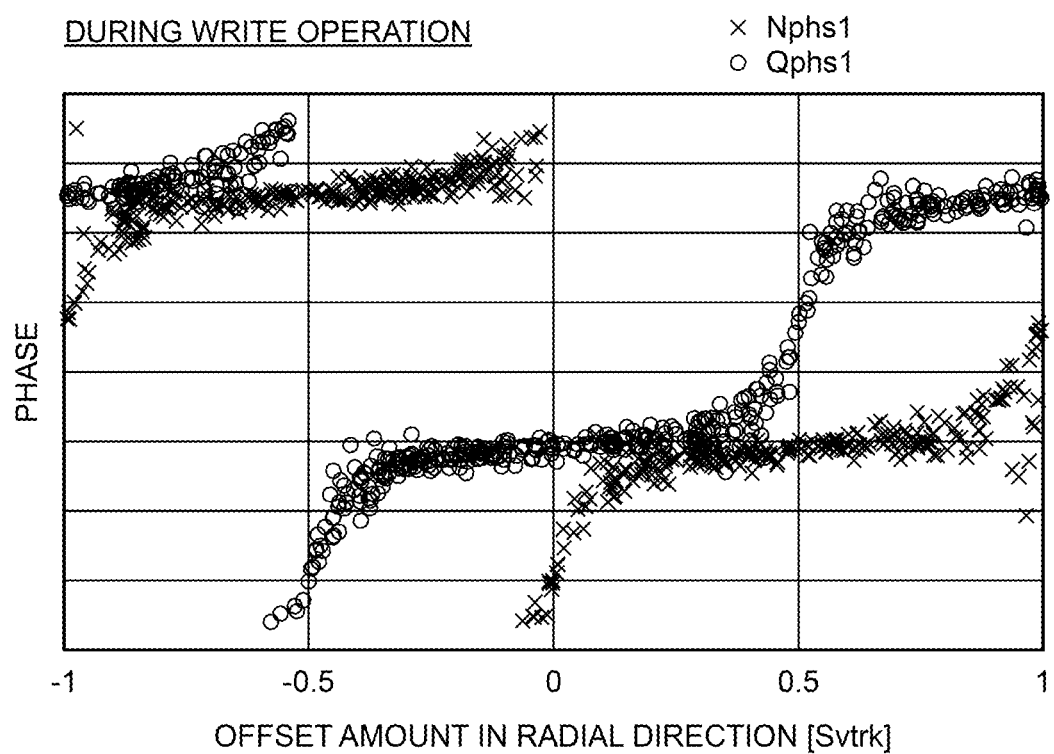
FIG. 14 is a diagram illustrating an example of a phase of the N-burst demodulated signal and a phase of the Q-burst demodulated signal in the burst demodulated value set during the write operation.

FIG. 14 is a diagram illustrating an example of a phase Nphs1 of the N-burst demodulated signal and a phase Qphs1 of the Q-burst demodulated signal in the burst demodulated value set during the write operation obtained by the process of S102 illustrated in FIG. 8. In this figure, the horizontal axis represents an offset amount from a servo track 41 in the radial direction, and the vertical axis represents a phase.

Comparing FIG. 11 with FIG. 13, it can be seen that the amplitude is slightly different between the non-write operation and the write operation. Comparing FIG. 12 with FIG. 14, it can be seen that the phase is slightly different between the non-write operation and the write operation.

Figure 15:
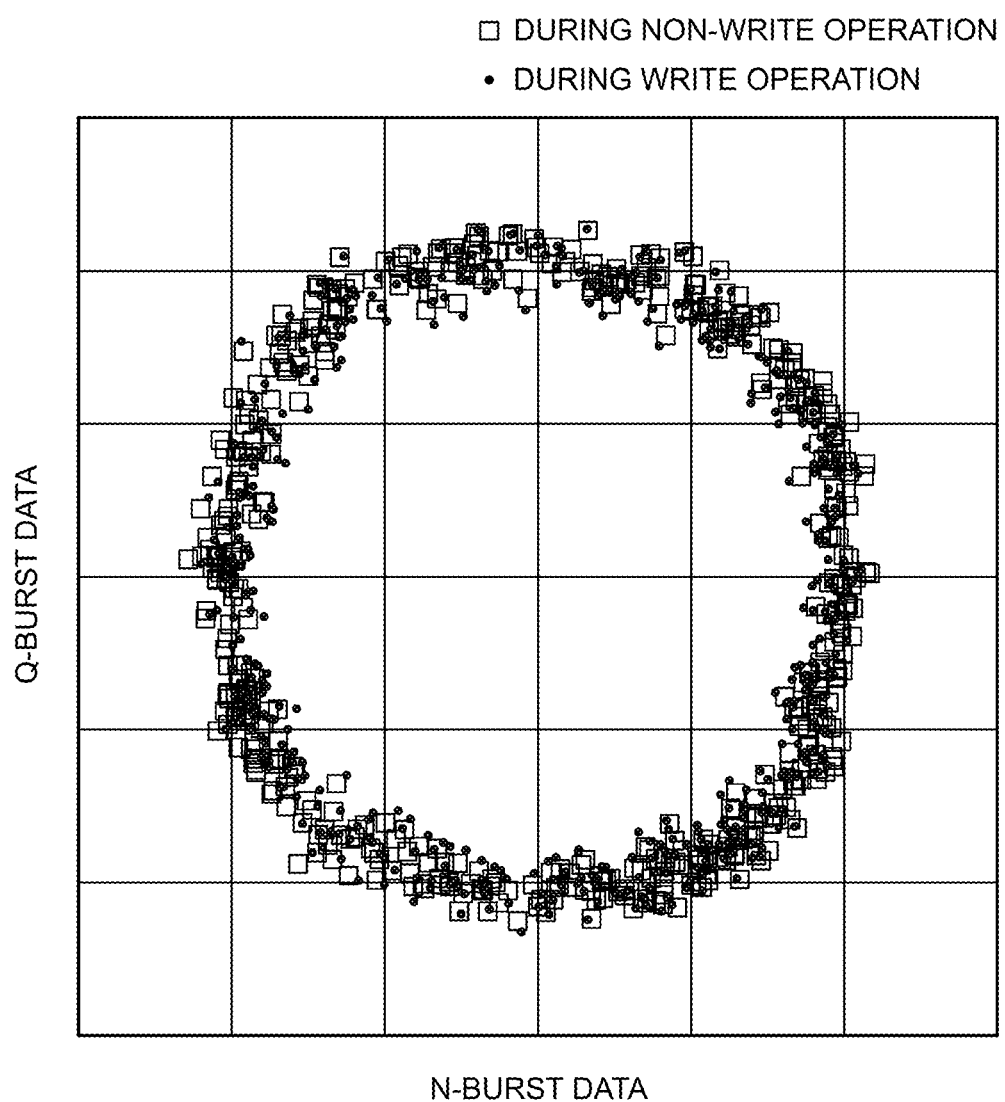
FIG. 15 is a graph in which burst data after initial phase correction calculated from the burst demodulated value set during the non-write operation and burst data after initial phase correction calculated from the burst demodulated value set during the write operation without correction using the correction setting information are plotted on a two-dimensional plane.

FIG. 15 is a graph in which burst data Nbst1 and Qbst1 after the initial phase correction calculated from the burst demodulated value set during the non-write operation and the burst data Nbst1 and Qbst1 after the initial phase correction calculated from the burst demodulated value set during the write operation without correction using the correction setting information 300 are plotted on a two-dimensional plane. The horizontal axis of this graph is the N-burst data axis, and the vertical axis is the Q-burst data axis. The waveform plotted on such a graph is also called a Lissajous waveform. As illustrated in this figure, it can be seen that the burst data Nbst1 and Qbst1 after the initial phase correction calculated from the burst demodulated value set during the non-write operation and the burst data Nbst1 and Qbst1 after the initial phase correction calculated from the burst demodulated value set during the write operation without correction using the correction setting information 300 do not match.

Figure 16:
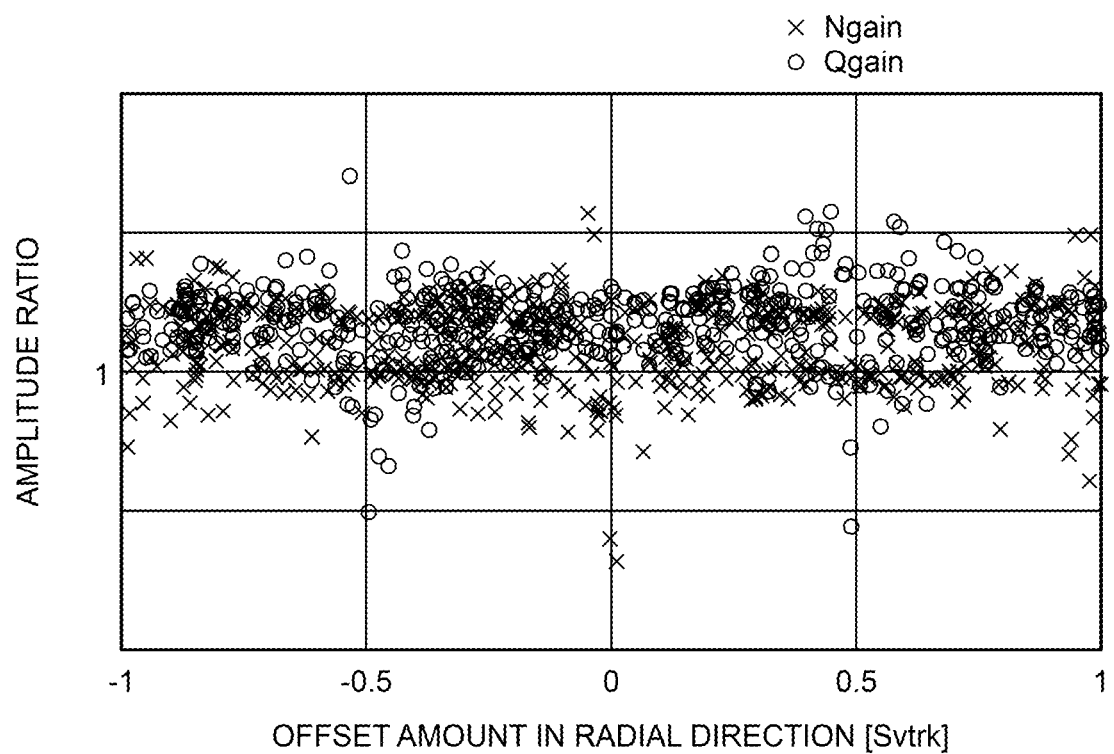
FIG. 16 is a diagram illustrating an example of amplitude ratios in the correction setting information.

FIG. 16 is a diagram illustrating an example of the amplitude ratios Ngain and Qgain in the correction setting information 300 obtained by the process of S103 illustrated in FIG. 8. In this figure, the horizontal axis represents an offset amount from a servo track 41 in the radial direction, and the vertical axis represents the magnitude of an amplitude ratio. If the amplitudes are equal between during the non-write operation and during the write operation, the amplitude ratio should be 1. However, in actuality, the amplitudes are slightly different between during the non-write operation and during the write operation, so that the amplitude ratio is slightly deviated from 1 as illustrated in this figure.

Figure 17:
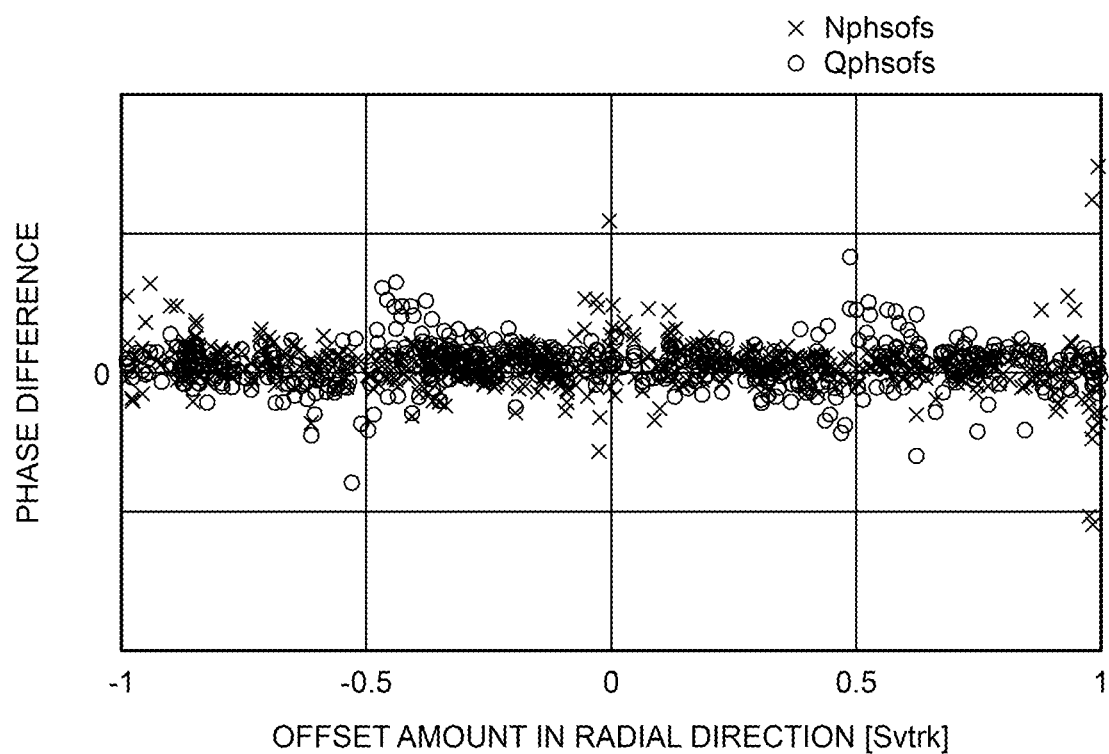
FIG. 17 is a diagram illustrating an example of phase differences in the correction setting information.

FIG. 17 is a diagram illustrating an example of the phase differences Nphsofs and Qphsofs in the correction setting information 300 obtained by the process of S103 illustrated in FIG. 8. In this figure, the horizontal axis represents an offset amount from a servo track 41 in the radial direction, and the vertical axis represents the magnitude of a phase difference. If the phases are equal between during the non-write operation and during the write operation, the phase difference should be 0. However, in actuality, the phases are slightly different between during the non-write operation and during the write operation, so that the phase difference is slightly deviated from 0 as illustrated in this figure.

Figure 18:
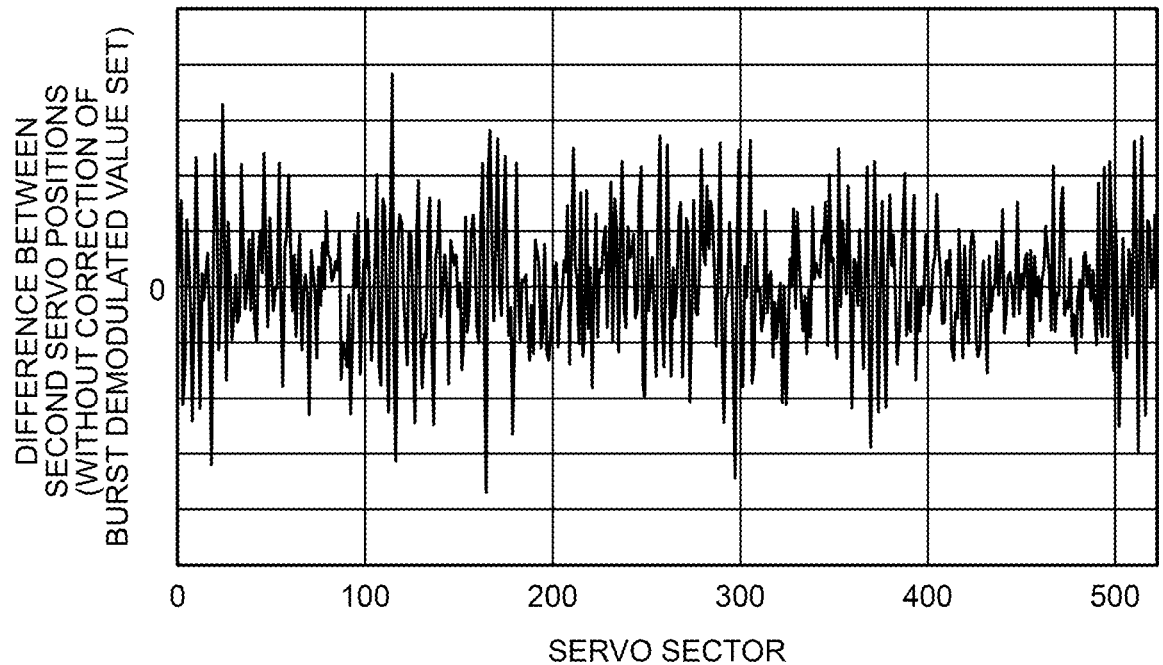
FIG. 18 is a diagram illustrating an example in which a difference between a second servo demodulation position calculated from the burst demodulated value set during the non-write operation and a second servo demodulation position calculated from the burst demodulated value set during the write operation without correction using the correction setting information is observed in servo sectors SV on a servo track.

FIG. 18 is a diagram illustrating an example in which the difference between the second servo demodulation position calculated from the burst demodulated value set during the non-write operation and the second servo demodulation position calculated from the burst demodulated value set during the write operation without correction using the correction setting information 300 is observed in a servo track 41 or the servo sectors SV on a data track. It can be seen from this figure that a difference is generated between the second servo demodulation positions because the difference between the burst demodulated value set during the non-write operation and the burst demodulated value set during the write operation is not eliminated.

Figure 19:
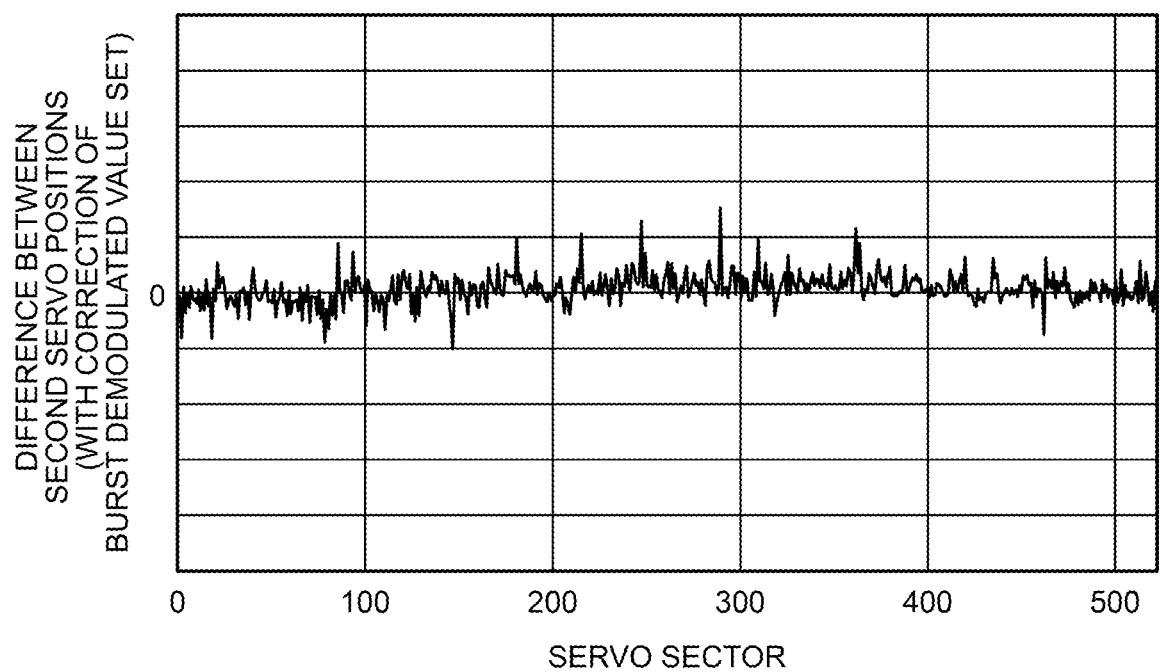
FIG. 19 is a diagram illustrating an example in which the difference between the second servo demodulation position calculated from the burst demodulated value set during the non-write operation and the second servo demodulation position calculated from the burst demodulated value set during the write operation while performing correction using the correction setting information is observed in servo sectors SV on a servo track.

FIG. 19 is a diagram illustrating an example in which the difference between the second servo demodulation position calculated from the burst demodulated value set during the non-write operation and the second servo demodulation position calculated from the burst demodulated value set during the write operation by performing correction using the correction setting information 300 is observed in a servo track 41 or the servo sectors SV on a data track. As can be seen from this figure, as a result of performing correction using the correction setting information 300 on the burst demodulated value set during the write operation, the difference between the second servo demodulation position during the non-write operation and the second servo demodulation position during the write operation is significantly suppressed.

As described above, the RRO correction amount recorded as the post code is learned during the non-write operation. Therefore, by performing the RRO correction in the non-write operation, an error based on the RRO between the target track and the position of the magnetic head 22 can be most effectively suppressed. According to the embodiment, the difference between the second servo demodulation position during the non-write operation and the second servo demodulation position during the write operation can be greatly suppressed, so that the error based on the RRO can be effectively suppressed even during the write operation similarly to the non-write operation. In other words, an error between the target track and the position of the magnetic head during the write operation can be suppressed. As a result, the designer can reduce the data track pitch and increase the storage capacity of the magnetic disk apparatus 1.

As described above, according to the embodiment, in the write operation, namely, the operation of performing writing in the data region DA while positioning the magnetic head 22, the SoC 30 operates as follows. The SoC 30 demodulates the burst patterns to obtain a burst demodulated value set. Then, the SoC 30 corrects the burst demodulated value set on the basis of a correction algorithm that uses the correction setting information 300 as an argument. Then, the SoC 30 calculates the corrected burst offset on the basis of the corrected burst demodulated value set.

Since the burst demodulated value set during the write operation can be made closer to the burst demodulated value set during the non-write operation, deterioration of the position error RPE during the write operation can be suppressed. As a result, the designer can reduce the data track pitch and increase the storage capacity of the magnetic disk apparatus 1.

Note that, in the non-write operation, namely, an operation of positioning the magnetic head 22 without performing writing to the data region DA, the SoC 30 demodulates the burst patterns to obtain a burst demodulated value set and calculates a burst offset on the basis of the burst demodulated value set without performing correction on the burst demodulated value set.

Moreover, according to the embodiment, as described with reference to FIG. 8, the SoC 30 demodulates the burst patterns in the positioning while positioning the magnetic head 22 without writing to the data region DA and obtains the burst demodulated value set during the non-write operation. The SoC 30 demodulates the burst patterns in the positioning while positioning the magnetic head 22 together with performing writing to the data region DA and obtains the burst demodulated value during the write operation. Then, the SoC 30 calculates the correction setting information 300 on the basis of the burst demodulated value set during the non-write operation and the burst demodulated value set during the write operation and stores the correction setting information 300 in the memory (for example, the FROM 28).

Therefore, during the write operation, it is possible to correct the burst demodulated value set output from the burst demodulation unit 252 to be brought into close to the burst demodulated value set during the non-write operation on the basis of the correction setting information 300 prepared in advance.

According to the embodiment, the servo data includes a post code indicating the RRO correction amount. The RRO correction amount is obtained while positioning the magnetic head 22 without performing writing. The SoC 30 further executes correction based on the post code in positioning of the magnetic head 22.

Therefore, the RRO can be appropriately corrected during the non-write operation. As described above, during the write operation, it is possible to correct the burst demodulated value set output from the burst demodulation unit 252 to be brought into close to the burst demodulated value set during the non-write operation. Therefore, even during the write operation, the RRO can be appropriately corrected similarly to the non-write operation.

Moreover, as described above, in the embodiment, the SoC 30 may calculate the correction setting information 300 for each of the servo sectors and store the correction setting information in the memory. Alternatively, the SoC 30 may calculate the correction setting information 300 for each two or more of the servo sectors SV or for each two or more of the servo tracks 41, and store the correction setting information in the memory.

According to the embodiment, it has been described that the burst demodulated value set contains the amplitude and the phase of the demodulated signal of each of the burst patterns, the correction setting information 300 includes the amplitude ratios Ngain and Qgain multiplied by the amplitude and the phase differences Nphsofs and Qphsofs added to or subtracted from the phase, and the correction algorithm is an algorithm for correcting the amplitude and the phase included in the burst demodulated value set on the basis of the correction setting information 300. The SoC 30 may be configured to correct only one of the amplitude and phase included in the burst demodulated value set during the write operation.

For example, in a case where the SoC 30 is configured to correct only the amplitude out of the amplitude and phase included in the burst demodulated value set, the correction setting information 300 is configured to include the amplitude ratio (namely, Ngain and Qgain) and not to include the phase difference (namely, Nphsofs and Qphsofs). Then, the SoC 30 corrects the amplitude included in the burst demodulated value set on the basis of the amplitude ratio (namely, Ngain and Qgain) included in the correction setting information 300 and the correction algorithm expressed in Equations (11) and (12).

In another example, in a case where the SoC 30 is configured to correct only the phase out of the amplitude and phase included in the burst demodulated value set, the correction setting information 300 is configured not to include the amplitude ratio (namely, Ngain and Qgain) but to include the phase difference (namely, Nphsofs and Qphsofs). Then, the SoC 30 corrects the phase included in the burst demodulated value set on the basis of the phase difference (namely, Nphsofs and Qphsofs) included in the correction setting information 300 and the correction algorithm expressed in Equations (13) and (14).

Figure 20:
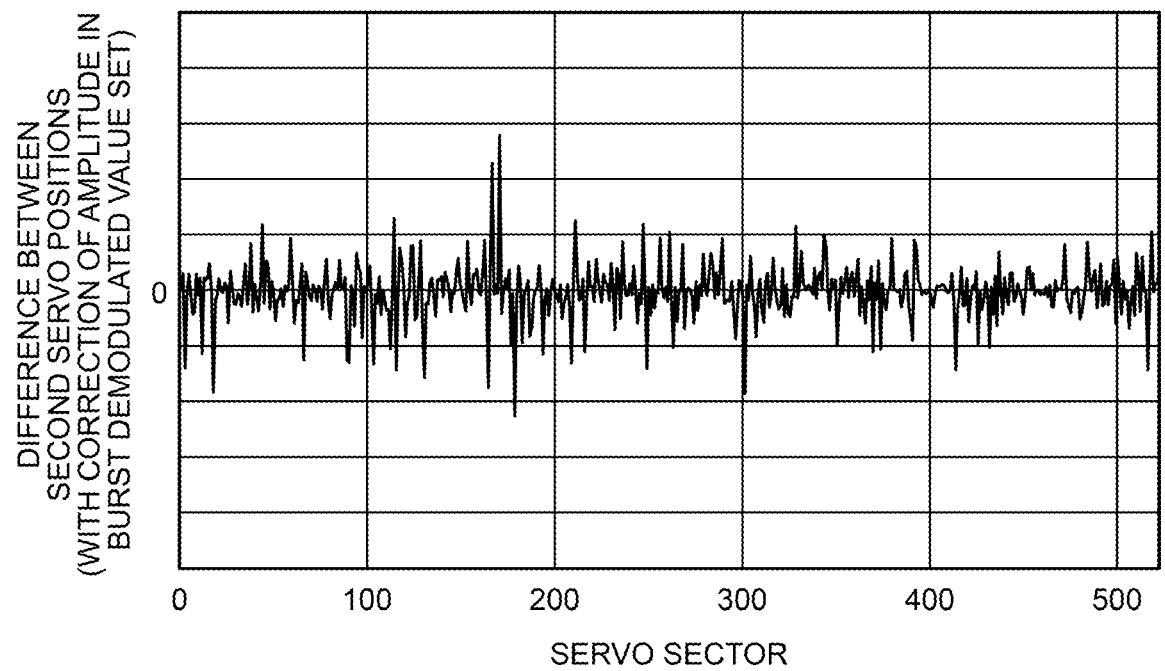
FIG. 20 is a diagram illustrating an example in which the difference between the second servo demodulation position calculated from the burst demodulated value set during the non-write operation and the second servo demodulation position calculated from the burst demodulated value set during the write operation by only correcting the amplitude is observed in servo sectors SV on a servo track.

FIG. 20 is a diagram illustrating an example in which the difference between the second servo demodulation position calculated from the burst demodulated value set during the non-write operation and the second servo demodulation position calculated from the burst demodulated value set during the write operation by only correcting the amplitude is observed in a servo track 41 or the servo sectors SV on a data track. Comparing FIG. 18 with this FIG. 20, it can be seen that even when only the amplitude is corrected, the difference between the second servo demodulation position during the non-write operation and the second servo demodulation position during the write operation can be suppressed.

Even when only the phase is corrected for the burst demodulated value set during the write operation, the difference between the second servo demodulation position during the non-write operation and the second servo demodulation position during the write operation can be suppressed.

In this manner, the burst demodulated value set contains the amplitude and the phase of the demodulated signal of each of the burst patterns, the correction setting information 300 includes the amplitude ratio or the phase difference, and the correction algorithm may be an algorithm to correct the amplitude or the phase included in the burst demodulated value set on the basis of the correction setting information 300.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
   a magnetic disk on which multiple servo tracks are provided, the multiple servo tracks being provided with multiple servo sectors arranged at intervals in a circumferential direction, the multiple servo sectors each storing servo data including burst patterns, each two of the multiple servo sectors adjacent to each other in the circumferential direction interposing a data region allowing data to be written;
   a magnetic head that executes writing and reading on the magnetic disk;
   a memory in which a first set value is stored; and
   a controller that, in a first operation of performing writing to the data regions while positioning the magnetic head,
      demodulates the burst patterns to obtain a first burst demodulated value set,
      corrects the first burst demodulated value set to obtain a second burst demodulated value set, the first burst demodulated value set being corrected on the basis of a correction algorithm using the first set value as an argument, and
      calculates, on the basis of the second burst demodulated value set, an offset amount of the magnetic head from one of the multiple servo tracks.

2. The magnetic disk apparatus according to claim 1, wherein, in a second operation of positioning the magnetic head without performing writing to the data regions, the controller
   demodulates the burst patterns to obtain a third burst demodulated value set, and
   calculates, on the basis of the third burst demodulated value set, an offset amount of the magnetic head from one of the multiple servo tracks.

3. The magnetic disk apparatus according to claim 1, wherein the controller
   demodulates the burst patterns to obtain a fourth burst demodulated value set while trying to position the magnetic head without performing writing to the data regions,
   demodulates the burst patterns to obtain a fifth burst demodulated value set while trying to position the magnetic head and performing writing to the data regions, calculates the first set value on the basis of the fourth burst demodulated value set and the fifth burst demodulated value set, and stores the first set value in the memory.

4. The magnetic disk apparatus according to claim 2, wherein the controller demodulates the burst patterns to obtain a fourth burst demodulated value set while trying to position the magnetic head without performing writing to the data regions, demodulates the burst patterns to obtain a fifth burst demodulated value set while trying to position the magnetic head and performing writing to the data regions, calculates the first set value on the basis of the fourth burst demodulated value set and the fifth burst demodulated value set, and stores the first set value in the memory.

5. The magnetic disk apparatus according to claim 3, wherein the first burst demodulated value set, the fourth burst demodulated value set, and the fifth burst demodulated value set each include an amplitude and a phase of a demodulated signal of each of the burst patterns, the first set value is an amplitude ratio or a phase difference, the amplitude ratio is a ratio between the amplitude included in the fourth burst demodulated value set and the amplitude included in the fifth burst demodulated value set, the phase difference is a difference between the phase included in the fourth burst demodulated value set and the phase included in the fifth burst demodulated value set, and the correction algorithm is an algorithm to correct the amplitude or the phase included in the first burst demodulated value set on the basis of the first set value.

6. The magnetic disk apparatus according to claim 4, wherein the first burst demodulated value set, the fourth burst demodulated value set, and the fifth burst demodulated value set each include an amplitude and a phase of a demodulated signal of each of the burst patterns, the first set value is an amplitude ratio or a phase difference, the amplitude ratio is a ratio between the amplitude included in the fourth burst demodulated value set and the amplitude included in the fifth burst demodulated value set, the phase difference is a difference between the phase included in the fourth burst demodulated value set and the phase included in the fifth burst demodulated value set, and the correction algorithm is an algorithm to correct the amplitude or the phase included in the first burst demodulated value set on the basis of the first set value.

7. The magnetic disk apparatus according to claim 1, wherein the first burst demodulated value set includes an amplitude and a phase of a demodulated signal of each of the burst patterns, the first set value includes a set value by which the amplitude is multiplied, or a set value added to or subtracted from the phase, and the correction algorithm is an algorithm to correct the amplitude or the phase on the basis of the first set value.

8. The magnetic disk apparatus according to claim 1, wherein the servo data further includes a post code having correction data for correcting a repeatable run-out (RRO), the correction data for correcting the RRO being an RRO correction amount calculated on the basis of data obtained by measuring positioning of the magnetic head without performing writing to the data region, and the controller further executes, in positioning of the magnetic head, head positioning correction based on the RRO correction data obtained from the post code.

9. The magnetic disk apparatus according to claim 3, wherein, for each of the multiple servo sectors, the controller calculates the first set value and stores the first set value in the memory.

10. The magnetic disk apparatus according to claim 3, wherein the controller calculates multiple first set values on the basis of multiple fourth burst demodulated value sets and multiple fifth burst demodulated value sets for two or more of the multiple servo sectors or for two or more of the multiple servo tracks, and stores an average value of the multiple first set values in the memory, the average value being used as the argument by the correction algorithm.

11. A method of performing an access to a magnetic disk by using a magnetic head, the magnetic disk being a magnetic disk on which multiple servo tracks are provided, the multiple servo tracks being provided with multiple servo sectors arranged at intervals in a circumferential direction, the multiple servo sectors each storing servo data including burst patterns, each two of the multiple servo sectors adjacent to each other in the circumferential direction interposing a data region allowing data to be written, the method comprising:

in a first operation of performing writing to the data regions while positioning the magnetic head, demodulating the burst patterns to obtain a first burst demodulated value set;

correcting the first burst demodulated value set to obtain a second burst demodulated value set, the first burst demodulated value set being corrected on the basis of a correction algorithm using a first set value as an argument; and calculating, on the basis of the second burst demodulated value set, an offset amount of the magnetic head from one of the multiple servo tracks.

12. The method according to claim 11, further comprising, in a second operation of positioning the magnetic head without performing writing to the data regions, demodulating the burst patterns to obtain a third burst demodulated value set, and calculating, on the basis of the third burst demodulated value set, an offset amount of the magnetic head from one of the multiple servo tracks.

13. The method according to claim 11, further comprising demodulating the burst patterns to obtain a fourth burst demodulated value set while trying to position the magnetic head without performing writing to the data regions, demodulating the burst patterns to obtain a fifth burst demodulated value set while trying to position the magnetic head and performing writing to the data regions, and calculating the first set value on the basis of the fourth burst demodulated value set and the fifth burst demodulated value set.

14. The method according to claim 12, further comprising
demodulating the burst patterns to obtain a fourth burst demodulated value set while trying to position the magnetic head without performing writing to the data regions,
demodulating the burst patterns to obtain a fifth burst demodulated value set while trying to position the magnetic head and performing writing to the data regions, and
calculating the first set value on the basis of the fourth burst demodulated value set and the fifth burst demodulated value set.

15. The method according to claim 13, wherein
the first burst demodulated value set, the fourth burst demodulated value set, and the fifth burst demodulated value set each include an amplitude and a phase of a demodulated signal of each of the burst patterns,
the first set value is an amplitude ratio or a phase difference,
the amplitude ratio is a ratio between the amplitude included in the fourth burst demodulated value set and the amplitude included in the fifth burst demodulated value set,
the phase difference is a difference between the phase included in the fourth burst demodulated value set and the phase included in the fifth burst demodulated value set, and
the correction algorithm is an algorithm to correct the amplitude or the phase included in the first burst demodulated value set on the basis of the first set value.

16. The method according to claim 14, wherein
the first burst demodulated value set, the fourth burst demodulated value set, and the fifth burst demodulated value set each include an amplitude and a phase of a demodulated signal of each of the burst patterns,
the first set value is an amplitude ratio or a phase difference,
the amplitude ratio is a ratio between the amplitude included in the fourth burst demodulated value set and the amplitude included in the fifth burst demodulated value set,
the phase difference is a difference between the phase included in the fourth burst demodulated value set and the phase included in the fifth burst demodulated value set, and
the correction algorithm is an algorithm to correct the amplitude or the phase included in the first burst demodulated value set on the basis of the first set value.

17. The method according to claim 11, wherein
the first burst demodulated value set includes an amplitude and a phase of a demodulated signal of each of the burst patterns,
the first set value includes a set value by which the amplitude is multiplied, or a set value added to or subtracted from the phase, and
the correction algorithm is an algorithm to correct the amplitude or the phase on the basis of the first set value.

18. The method according to claim 11, wherein
the servo data further includes a post code having correction data for correcting a repeatable run-out (RRO), the correction data for correcting the RRO being an RRO correction amount calculated on the basis of data obtained by measuring positioning of the magnetic head without performing writing to the data region, and
the method further comprises executing, in positioning of the magnetic head, head positioning correction based on the RRO correction data obtained from the post code.

19. The method of claim 13, further comprising calculating the first set value for each of the multiple servo sectors.

20. The method according to claim 13, further comprising
calculating multiple first set values on the basis of multiple fourth burst demodulated value sets and multiple fifth burst demodulated value sets for two or more of the multiple servo sectors or for two or more of the multiple servo tracks, and
calculating an average value of the multiple first set values, the average value being used as the argument by the correction algorithm.

* * * * *